United States Patent
Bhargava et al.

(10) Patent No.: US 7,568,019 B1
(45) Date of Patent: Jul. 28, 2009

(54) ENTERPRISE MANAGEMENT SYSTEM FOR NORMALIZATION, INTEGRATION AND CORRELATION OF BUSINESS MEASUREMENTS WITH APPLICATION AND INFRASTRUCTURE MEASUREMENTS

(75) Inventors: Sunil Bhargava, Hillsborough, CA (US); Peter Relan, Atherton, CA (US); Michael Barrett Stern, San Francisco, CA (US)

(73) Assignee: Entrust, Inc., Ottawa, On (CA)

( * ) Notice: Subject to any disclaimer, the term of this patent is extended or adjusted under 35 U.S.C. 154(b) by 1254 days.

(21) Appl. No.: 10/367,578

(22) Filed: Feb. 14, 2003

Related U.S. Application Data

(60) Provisional application No. 60/447,623, filed on Feb. 14, 2003, provisional application No. 60/447,892, filed on Feb. 14, 2003, provisional application No. 60/357,743, filed on Feb. 15, 2002, provisional application No. 60/357,738, filed on Feb. 15, 2002.

(51) Int. Cl.
*G06F 15/173* (2006.01)
(52) U.S. Cl. ..................... 709/223; 709/224
(58) Field of Classification Search ............. None
See application file for complete search history.

(56) References Cited

U.S. PATENT DOCUMENTS

| | | | |
|---|---|---|---|
| 6,311,144 B1 * | 10/2001 | Abu El Ata | 703/2 |
| 6,427,132 B1 * | 7/2002 | Bowman-Amuah | 703/22 |
| 6,687,733 B2 * | 2/2004 | Manukyan | 709/200 |
| 6,978,247 B1 * | 12/2005 | Bogart et al. | 705/8 |
| 6,990,437 B1 * | 1/2006 | Abu El Ata | 703/2 |
| 7,013,289 B2 * | 3/2006 | Horn et al. | 705/26 |
| 7,031,901 B2 * | 4/2006 | Abu El Ata | 703/21 |
| 7,035,786 B1 * | 4/2006 | Abu El Ata et al. | 703/21 |
| 2001/0037374 A1 * | 11/2001 | Shrum et al. | 709/217 |
| 2002/0049573 A1 * | 4/2002 | El Ata | 703/2 |
| 2002/0165967 A1 * | 11/2002 | Morgan | 709/227 |

OTHER PUBLICATIONS

HP Firehunter "Internet Service Management Solutions" (hereinafter Firehunter) dated Revised Apr. 5, 1999 and pp. 1-143.*

* cited by examiner

*Primary Examiner*—John Follansbee
*Assistant Examiner*—Dhairya A Patel
(74) *Attorney, Agent, or Firm*—Hickman Palermo Truong & Becker

(57) ABSTRACT

A method is provided for monitoring, predicting performance of, and managing Business Operations by the simultaneous, real-time Integration, Normalization and Correlation of direct measurements at the Business Layer and other Layers of Business Operations. The other Layers considered, may include, for example, Application and Infrastructure Layers. The system enables the user to automate sophisticated management tasks by Correlating measurements of activity, performance and availability at all Layers of Business Operations. Significantly, the techniques described herein extend the domain of the Correlations across real-time measurements from all Layers of Business Operations, giving central importance to the measurements in the Business Layer within the Correlations.

38 Claims, 33 Drawing Sheets

Attribute Category

|  | Business | Application | Infrastructure |
|---|---|---|---|
| Business |  |  |  |
| Application | X |  |  |
| Software Infrastructure | X | X |  |
| Network Infrastructure | X | X |  |

Layer

FIG. 19

ENTERPRISE MANAGEMENT SYSTEM FOR NORMALIZATION, INTEGRATION AND CORRELATION OF BUSINESS MEASUREMENTS WITH APPLICATION AND INFRASTRUCTURE MEASUREMENTS

RELATED APPLICATIONS

This application is related to and claims priority from the following provisional applications, the content of each of which is incorporated herein in its entirety, for all purposes:

U.S. Provisional Patent Application Ser. No. 60/357,743, filed on Feb. 15, 2002, entitled METHOD OF DISCOVERING BUSINESS PROCESSES, WORKFLOWS AND APPLICATION INTERACTIONS BY OBSERVING STRUCTURED NETWORK TRAFFIC;

U.S. Provisional Patent Application Ser. No. 60/357,738, filed on Feb. 15, 2002, entitled METHOD OF ENFORCING MANAGEMENT POLICIES ON STRUCTURED MESSAGE STREAMS OF NETWORK TRAFFIC;

U.S. Provisional Patent Application Ser. No. 60/447,623, filed on Feb. 14, 2003, entitled METHOD OF IDENTIFICATION AND ASSIGNMENT OF PROBABLE BUSINESS FAULT CAUSE AND QUANTITATIVE BUSINESS IMPACT BY BUSINESS-TO-INFRASTRUCTURE DEDUCTION IN INFORMATION SYSTEMS;

U.S. Provisional Patent Application Ser. No. 60/447,892, filed on Feb. 14, 2003, entitled METHOD OF IDENTIFICATION AND MANAGEMENT OF BUSINESS EXCEPTIONS AND BUSINESS SERVICE LEVELS BY COMBINING BUSINESS INDICATORS AND TECHNICAL INDICATORS INCLUDING TECHNICAL SERVICE LEVELS.

FIELD OF THE INVENTION

The present invention relates to the field of Enterprise Network and Systems Management, Application Performance Management, Service Level Management, Business Activity Monitoring, Business Impact Management, and more specifically to a method and system for managing computer-implemented Business Operations in an enterprise in real time.

BACKGROUND OF THE INVENTION

When an enterprise's mission critical Business Operations are highly dependent on its information systems, it is extremely important to operate the information systems with the highest levels of availability and performance to achieve optimal Business Operations. Business Operations commonly include the execution of an enterprise's business processes to achieve certain business goals. Operations of the information systems that support Business Operations are commonly referred to as IT Operations. In enterprises where Business Operations are highly dependent on IT Operations, Business Operations managers and IT Operations managers are constantly looking for Correlations between the performance of Business Operations and the performance of the IT Operations supporting the Business Operations.

Business Operations that are dependent on IT Operations are often modeled as multiple Layers of Operation, which include a Business Layer, an Applications Layer and an Infrastructure Layer. The Business Layer includes elements such as Business Services (e.g. an Internet Order Entry Business Service), Business Transactions (e.g. an Internet Order) and Business Traffic (e.g. a Checkout request). The Application Layer includes elements such as Application Services (e.g. the Internet Order Entry Website), and Application Components (e.g. Web page, Enterprise Java Bean). The Infrastructure Layer includes elements such as Databases, Hosts, Routers (e.g. Computer Server Host for the Internet Order Entry Website). Together these three layers provide the underpinning for IT Operations based Business Operations.

Issues in Business Operations are usually detected by taking direct measurements in the Business Layer, whereas, issues in IT Operations are usually detected by taking direct measurements in the Application and Infrastructure Layers. An example of an issue in Business Operations is: a lower than expected number of Internet orders on a given day, which can be detected by taking a direct measurement of the number of Business Transactions in the Business Layer. An example of an issue in the Application Layer is poor response time of the internet order entry website at any given time, which can be detected by taking a direct measurement of the response time of the Application Service modeling the website in the Application Layer. An example of an issue in the Infrastructure Layer is very high processor utilization of the computer for the Internet order entry website, which can be detected by taking a direct measurement of the processor utilization of a Host in the Infrastructure Layer.

Past attempts to find such Correlations in real-time between IT and Business Operations fall into two categories of approaches: bottom up Infrastructure Event Aggregation, and Business Activity Monitoring. Examples of bottom up Infrastructure Event Aggregation systems include HP Openview Service Level Navigator, Tivoli Business Systems Manager, Mercury Interactive Topaz Business Availability Cockpit, and Managed Objects Formula. Examples of Business Activity Monitoring systems include solutions offered by companies such as Indurasoft and Praja (now part of Tibco).

According to the bottom up Infrastructure Event Aggregation approach, critical availability and performance measurement Events that occur in the Infrastructure (network and systems technology), or in the Application Layer of IT Operations are collected and aggregated in a hierarchical sense to "derive" the impact on Business Operations. The problem with this approach is that since no direct measurements are performed in the Business Layer, this approach only offers a best guess as to the potential impact on Business Operations. Likewise, reporting on Service Level performance of Business Operations is "derived" from Service Level performance of Infrastructure and Application Layers, and is a best guess approach. Finally, there is no way to track top-down the Probable Cause of issues in Business Operations and Correlate such issues to the bottom up Events from the Infrastructure and Application Layers, because direct measurements in the Business Operations are not included in the first place.

In the Business Activity Monitoring approach, Business Operations are directly monitored and measurements are taken in the Business Layer in real-time. However no Events are Integrated, Normalized and Correlated from IT Operations in real-time, thus it is not feasible to Correlate between issues in Business Operations and IT Operations.

In addition to the above two approaches, there has been some generalized research work in the field of Complex Event Processing which does not specifically address the method and system for addressing Correlations between IT Operations and Business Operations. Instead, a general purpose theory of Event Aggregation is described in a way that is usable in many different types of methods and systems for event management.

Finally, there has been extensive work on Event Correlation which refers to the actual techniques used to perform correlations. The well known techniques used to perform Event Correlations are, for example, Rule-Based, Model-Based, Codebook-Based etc. These techniques do not specify the kinds of data being correlated, but the classes of algorithms used to perform Correlations. Techniques described herein focus on the domains and types of Events being Correlated and the importance of the Events in the Business Layer in the Correlations, regardless of the classes of algorithms used to perform the Correlations.

SUMMARY OF THE INVENTION

A method is provided for monitoring, predicting performance of, and managing Business Operations by the simultaneous, real-time Integration, Normalization and Correlation of direct measurements at the Business Layer and other Layers of Business Operations. The other Layers considered, may include, for example, Application and Infrastructure Layers. The system enables the user to automate sophisticated management tasks by Correlating measurements of activity, performance and availability at all Layers of Business Operations. Significantly, the techniques described herein extend the domain of the Correlations across real-time measurements from all Layers of Business Operations, giving central importance to the measurements in the Business Layer within the Correlations.

According to one aspect, the techniques described herein are based on a Model of Layers of Business Operation. Three layers: a Business Layer, an Application Layer, and an Infrastructure Layer, are taken together to represent the operation of a business or, in other words a Model of Layers of Business Operation. Such a Model is a way of thinking about and describing the technology assets of IT Operations and their interactions in the Business Operations of an enterprise.

THE BUSINESS LAYER: The Business Layer of an enterprise's Business Operations includes, for example, Business Services, Business Traffic and Business Transactions. In a particular embodiment, an Internet-based order entry Business Service is a Business Layer entity which consists of order entry related Business Traffic and order entry related Business Transactions. The Business Layer depends on underlying Application and Infrastructure Layers for its implementation. Measurements of activities in the Business Layer include measurements of Business Traffic statistics such as number of requests for logins on a website, details of traffic messages such as the order size of web-based order form submission, and details of transactions such as number and dollar amounts of total number of orders captured at any given time.

THE APPLICATION LAYER: The Application Layer of an enterprise's Business Operations consists of the business logic and data models encapsulated in software commonly referred to as Application Services and Application Components. For example, the actual software that implements the website that can take orders for products or provide customer service is an Application Service which is implemented with Application Components such as Web Pages, Java Beans, Database Schemas etc. Measurements in this layer include, for example, Synthetic Transactions that simulate real user Transactions in order to measure statistical response time of the Application Service or its Application Components.

INFRASTRUCTURE LAYER: The Infrastructure Layer of an enterprise's Business Operations consists of the network, systems, storage and middleware elements that provided the basis for building and running the Applications layer. It is further comprised of the Software Infrastructure Layer and the Network Infrastructure Layer. Middleware elements such as Web Servers and Application Servers, and Database Servers belong in the Software Infrastructure Layer. Network addressable elements such as Routers, Hosts, Firewalls, Load balancers, IP Interfaces, Network Attached Storage Servers reside in the Network Infrastructure Layer. Measurements in this Layer include availability status monitoring as well as performance monitoring measurements such as processor utilization sampling.

ASSOCIATIONS: Associations in the Model of Layers of Business Operations identify relationships between elements within a single Layer, and across multiple Layers, such that these relationships may be used later for techniques including, but not limited to, Correlations.

According to one aspect, the techniques described herein are based on modeling measurements from each layer as Events, modeling elements in each layer to which the measurements pertain as Monitored Objects, and modeling the rules for Correlating and Analyzing Events and Monitored Objects as Policies. Furthermore, those Events that are deemed to be useful to users such as IT Operations managers and Business Operations Managers are tagged as Alerts. Events are used for real-time instantaneous measurements, while Monitored Objects are used for storing persistent information collected from Events over time. Events, Alerts, Monitored Objects and Policies are used together to perform Normalization, Integration and Correlation of measurements across the Infrastructure, Application and Business Layers. In one embodiment Events can be represented as streams of XML documents, Alerts can be represented as displayable entities in a graphical user interface, Monitored Objects can be represented as a set of schemas in a relational database, and Policies can be represented as programs in Java or Bean Shell programming languages

BRIEF DESCRIPTION OF THE DRAWINGS

FIG. 19 is a diagram illustrating attribute visibility by category, according to an embodiment of the invention;

DETAILED DESCRIPTION OF THE INVENTION

Figure 1:
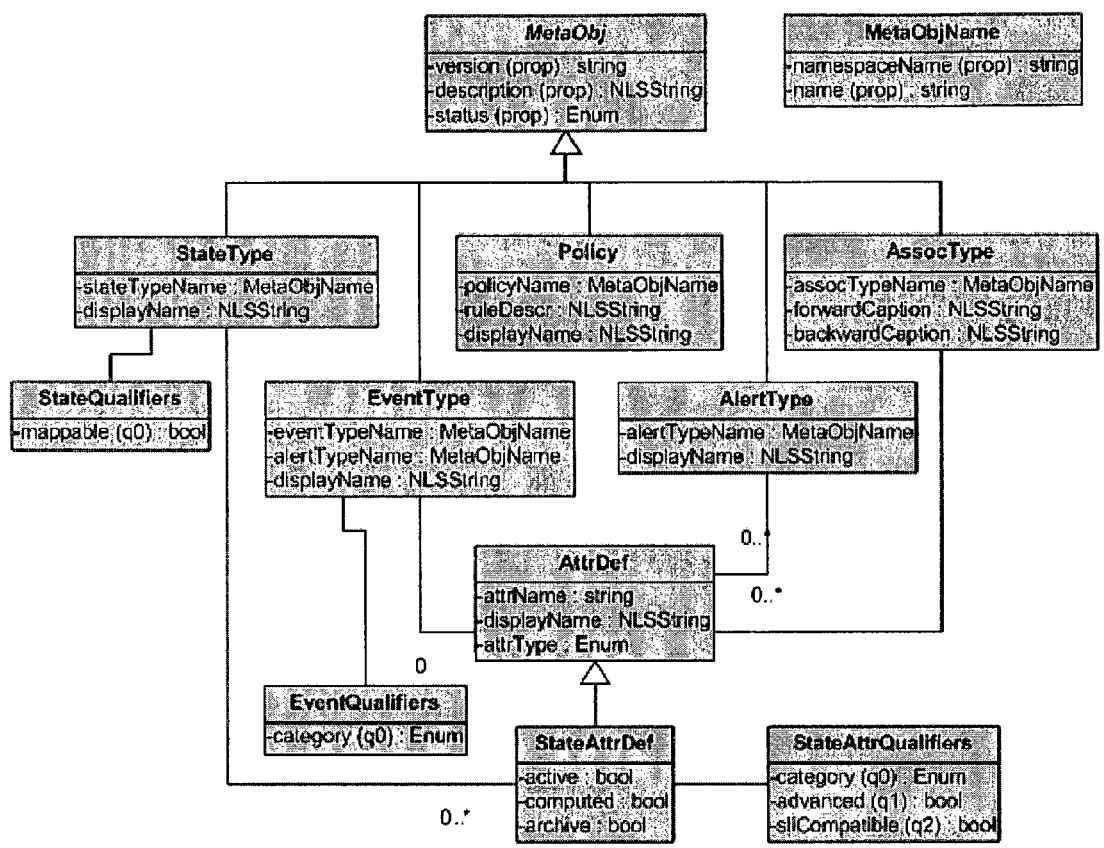
FIG. 1 is a block diagram illustrating meta-object types, and relationships between meta-object types, according to one embodiment of the invention.

Techniques are provided for improving on existing systems by simultaneous, real-time Normalization and Integration of directly observed Events obtained from all Layers of Business Operation into a single system and data model in real-time. Furthermore, these techniques generate Correlations of Events in the Business Layer, considered as "Anchor Events" with Events across all other layers, allowing more effective automated management of Business Operation than is possible when such Correlations must be performed by human operators. Events, Monitored Objects and Policies are described in detail in the Data Model, wherein Events that are used in Correlations by human operators are also referred to as Alerts. Details about certain functions mentioned herein are described in detail in the related patent applications that have been incorporated herein by reference.

Events in the Business Layer provide the most direct measurement of the availability and performance of Business Operations, hence their importance as "Anchor Events" in any Correlations between Business Operations and IT Operations issues. These Anchor Events enable the efficient use of the Model of Layers of Business Operations as a reference to search for Correlated Infrastructure Layer or Application Layer Events—thus eliminating the need for derivation or guesswork to associate issues in IT Operations with issues in Business Operations. Herein, a method is described of Integrating and Normalizing Events from the Business Layer, Application Layer and Infrastructure Layer, utilizing the Events from the Business Layer as the Anchor Events that guide all Correlation with Events from the Infrastructure and Application Layers. According to one embodiment, the events from the Business Layer include representations of Business Traffic flows based on XML or HTML, and Business Transactions based on SQL.

Techniques are provided herein for comprehensive real-time monitoring of Events in the Business Layer so as to "enrich" the Model of Layers of Business Operation that would otherwise be based solely on monitoring Events in the Infrastructure and Application Layers. This "enriched" Model includes not only Business Services, but also Business Service Opers and Business Traffic Groups in the Business Layer. According to one embodiment, techniques are provided "enrich" the Model by discovering application interactions, workflows and business processes by observing and interpreting structured network traffic in the Business and Application Layer. Details of this approach are described in Method of Discovering Business Processes, Workflows and Application Interactions By Observing Structured Network Traffic The method of Normalizing measurements from the Business Layer with measurements from other Layers involves the translation of all measurements into a common Event format, with a common structure for Name, Timestamp and other Event Attributes described in the detailed Data Model. The method of Integrating Events from the Business Layer with Events from other Layers involves the persistence of Normalized Events from the Business Layer and the other Layers into a common Event Store for all Events described in detail in the Data Model.

The method of Correlating Events obtained from all Layers of Business Operation in real-time involves, in one embodiment, evaluating measurements encoded as streams of structured network traffic and applying Policies. The method of applying Policy involves the application of user-defined rules to Normalized Events and generating additional Events and/or recording computed values from the raw values in Normalized Events into Attributes of Monitored Objects.

Policy based management techniques have been used before to apply rules to measurements at each individual Layer of Business Operation. However, such techniques have not applied a Policy uniformly on a stream of Infrastructure, Application or Business Layer Events, as is described herein. According to one embodiment, techniques are provided to enforce management Policies concurrently on streams of incoming measurements from the Infrastructure, Application and Business Layers. Details of this approach are described in Method of Enforcing Management Policies On Structured Message Streams of Network Traffic In the method described herein, an issue observed in Business Operations is Correlated to issues observed in IT Operations by taking a measurement in the Business Layer through an Event, by treating the Business Layer Event as the Anchor Event, and by using the "enriched" Model as a reference. According to one embodiment, techniques are provided to answer the following question in real-time: "When issues occur in Business Operations, are they due to any IT Operations issues, and if so what is the quantitative impact of such IT Operations issues on Business Operations?". Techniques are provided to use directly measured Business Layer Events as inputs into the computation of quantitative impact. Furthermore the quantitative impact on Business Operations is assigned to issues in IT Operations through the Probable Cause identification mechanism. The Probable Cause identification mechanism involves Correlating a Business Layer Event with associated Infrastructure and Application Layer Events to yield a Probable Cause or "suspect" list of Events for Business Layer Events. Details of the quantitative impact and probable cause approach are described in the related application entitled: Method of Identification and Assignment of Probable Business Fault Cause and Quantitative Business Impact by Business-to-Infrastructure Deduction in Information Systems A method is provided for defining and managing certain types of issues in Business Operations as Business Exceptions. Simple issues in Business Operations can be modeled simply as Events in the Business Layer based on a direct measurement Event. A Business Exception can be defined as a complex combination of cumulative measurements in terms of Attributes of Monitored Objects in the Business and Application Layer. According to one embodiment, techniques are provided to answer the question "What has been the cumulative performance of Business Operations against certain agreed upon objectives and why has this cumulative performance deviated from the objectives?". Deviations of cumulative performance of aspects of Business Operations from expected performance are modeled as Business Exceptions, which in turn are modeled as Events. Thus all principles of Correlation and Probable Cause Identification apply to Business Exceptions. Details of this approach are described in the specific invention: .Method of Identification and Management of Business Exceptions and Business Service Levels by Combining Business Indicators and Technical Indicators including Technical Service Levels.

Unified Data Model

Definitions

Active Attribute—an attribute for which an event is thrown every time the values changes Adapter—a plug-in into our system which presents information and functionality from some third-party EMS Adapter Event—an event which is injected into our system from an adapter. Generally speaking, these refer to object's within the Adapter's own type system, and need to be translated into our type system.

Adapter Event Translation Policy—type of policy which matches to a particular Adapter's event types and translates those events into events within our native type system. Every Adapter requires an Adapter Event Translation Policy in order to be properly integrated into our system.

Admin Event—an Event which signals important events internal to the XTMS system to the end user Alert—an object associated with a Displayable Event which contains workflow data associated with the resolution of that Event Alert Type Group—a collection that facilitates the query of alert types which all belong to a coherent abstract alert type Annotation—a log entry attributed to an Alert which an operator writes in order to communicate with other operators, typically to report on the progress in repairing the problem associated with the Alert, or to add more information to the Alert.

Application (category)—categorization of an object, attribute on an object, or an event which indicates that it is application related. Includes measurements taken from a user perspective.

Application Status—operational status of a Managed Application Object as measured from the application user's perspective. The major diagnostics underneath this status measurement are application synthetic transactions.

Application Synthetic Transaction—a synthetic transaction that tests the status and performance of an application's Opers (APIs)

Association—a semantically-valued relationship between two objects, which is typically directional in nature.

Attribute—a named value which is associated with a state object, alert, event, or association Availability—the percentage of the time that a Monitored Managed Object is not in CRITICAL status, with respect to either infrastructure, application, or business status. There is one flavor of availability for each type of status.

Business (category)—categorization of an object, attribute on an object, or an event which indicates that it is business related.

Business Event—an Event which reports on business state

Business Status—a status aggregated from all of the Severities of all Business Exceptions defined on a business layer object.

Causality—the relationship between Events which are created via a Policy to the Event which triggered that Policy Correlation—a logical relationship which links two events according to some extrinsic relationship in the real world. For example, an Event reporting a database going down and an Event representing a trouble ticket reporting an application failure might be correlated. We stipulate that causality relationships are explicitly excluded from what we call correlation.

Customization—the act (or period of performing the act) of enhancing our out-of-the-box system with customer-specific metadata (such as types), policies, and data (such as a concrete enterprise model)

Derived Event—an Event which is created by a Policy.

Discovery Event—an Event sent to our system from an Adapter to signal the discovery of a new Managed Object.

Enterprise Model—instantiated model of concrete managed objects, associations, and alerts which describe an enterprise within a managed domain Event—a data structure used to notify either the system or an end user about some state change or phenomenal occurrence Event Type Group—a collection that facilitates the query of event types which all belong to a coherent abstract event type Infrastructure (category)—categorization of an object, attribute on an object, or an event which indicates that it is related to a system operational perspective.

Infrastructure Status—operational status of a Monitored Managed Object as measured from an infrastructural perspective. The major diagnostics underneath this status measurement are infrastructure synthetic transactions and status events injected into the system via EMS Adapters.

Infrastructure Synthetic Transaction—a synthetic transaction which tests the operational status and performance of infrastructural elements.

Injection—our term for the introduction of an outside Event into our system

Managed Object—a State Object which is interesting to an end-user. Managed Objects are visible from within our applications, whereas other State Objects are not.

Managed Object Event—an Event which signals some life cycle change for a particular managed object.

Maintenance Window—a period of time during which the system should consider a Monitored Managed Object to be non-operational in order to allow IT professionals to conduct maintenance upon it. Availability metrics do not suffer during a maintenance window.

Meta-object—an object that describes a type, such as the EventType object that defines the Event types MTTR (Mean Time To Repair)—the average time that a managed object remains CRITICAL. There are infrastructure, application, and business flavors of MTTR measurements which correspond to the same flavors of status.

Namespace—the top level name in a two-part naming scheme for Meta-objects

Network Infrastructure—any Managed Object which relates to networking elements in the enterprise Observed Event—an Event which is detected from our system's external environment. Examples are Adapter Events and Real Transaction Events Oper (or Operation)—a (typically remote) programmatic entry point into an Application Component Origin—an indication of the source of an Event. For example, "OpenNMS", "Probe", etc. Derived Events always have an origin of "Policy".

Originating Policy—the Policy which created a Derived Event

Policy—a rule (or the code that manifests a rule) which gets applied upon a trigger of the detection of a particular event or change to a state object. The output of such rules are typically new events and/or changes to state object attributes.

Priority—a subjective measure of the importance of an Alert

Probe—a set of synthetic transactions which are scheduled at once, which execute in a coordinated manner, and which yield a single result.

Property—attributes which are stored directly within the columns of a data model object's native tables within the repository database Pseudo-attribute—a concept within the XApp API which allows an XApp client to query on a quantity which is not actually represented in our Enterprise Model as an attribute by use of a syntax which is identical to that which is used to query an actual attribute.

Qualifier—a metadata decorator added to a type or an attribute definition which modifies its behavior in the system or method of display within an application Repository—the centralized logical database which stores a customer's entire Enterprise Model, as well as a coherent set of certain system data and metadata Server Page—an ASP or JSP/Servlet Severity—an objective measure of the localized impact of an Event.

SLO (Service Level Objective)—a formula which measures how well a service is performing, always coupled with definitions of threshold levels at which point violations of specific severities can be declared.

SLO Violation—an Event which signals that an SLO threshold criterion has been crossed.

Software Infrastructure—any Managed Object which relates to software server elements in the enterprise, such as middleware and databases.

State Object—an entity which is represented within a well-defined schema in our repository and presented to the system according to a well-known model. Just about any static concept can be represented by a state object.

State Type—a meta-object defining a type for state objects (including Managed Objects)

State Type Group—a collection that facilitates the query of state types which all belong to a coherent abstract state type Synthetic Transaction—a programmatic test of the operational status and/or performance of a system. Synthetic Transactions often (but not always) mimic real traffic patterns that actual end users would initiate against the system.

Technology (category)—categorization of an object, attribute on an object, or an event which indicates that it is technology related. Includes both Infrastructure and Application categories.

(Real) Traffic—distributed message traffic that flows between Application Components Traffic Event—an Event which marks the interception of actual message traffic Triggering Event—an Event which triggers a Policy, which in turn creates a Derived Event XApp—an API which presents XServer functionality to applications in a more appropriate manner than the XServer API itself, which is strictly for internal use.

XServer—the primary server and business logic engine within our system

Data Model-Core Type System-Meta-Objects

FIG. 1 is a block diagram illustrating meta-object types, and relationships between meta-object types, according to one embodiment of the invention. All Meta Object types have the following attributes:

| Version | string | The version of this MetaObj. Not important for meta-objects which are types, but quite important for Policies. |
|---|---|---|
| Description | NLSString | Human readable description of the type or policy |
| Status | Enum | One of the following. Ignored for a policy. ACTIVE - the type is fully functional INACTIVE - for event types only, no new events of this type can be generated (created) DUMMY - this type is a dummy (see below) OBSOLETE - this type has been removed from the system |

Meta-Object Naming

Every meta-object is included within a namespace. Those types which are packaged "out of the box" by the platform appear within the "SYSTEM" namespace. Those which are integrated into the platform from customers or third parties must be within a namespace indicating the company who is providing the integrated types, in reverse DNS notation delimited by a period, e.g. "com.cisco", etc. Namespaces can be of arbitrary depth, but they are always treated by the platform as one large literal string, i.e. the platform provides no support for matching sub-names which appear at an arbitrary depth. The "name" part of MetaObjNames are always atomic names; hierarchy is always expressed within the namespace alone.

Each of these meta-objects also has at least one display name, for localization when displayed on the GUI. The display names don't have namespaces, and there is no inherent check for uniqueness.

Meta-Object Qualifiers

The type system allows for applications to decorate types with metadata which only have meaning to the applications themselves, not to the platform. Such metadata are referred to as "qualifiers". The platform stores this metadata along with the platform-supported type metadata, but then ignores it and never interprets it. The application can request the qualifiers for a type whenever it desires to use them to modify its own behavior.

Currently, qualifiers are only used for state types, event types, and attribute definitions, although the platform offers the ability to support them for any meta-object.

Since the platform has no advanced knowledge of how, when, or if a qualifier is to be used or not, it does not support querying qualifiers by application-specific names. Rather, qualifiers are queried by using names "qualifier0", "qualifier2", through "qualifier9". Each application that uses the platform can map any and all of these to whatever semantics they desire. If an application wants to use their own mnemonic names rather than mechanistic names such as "qualifier1", they must provide a mapping in their own application code.

State Object Types

All Managed Object types, i.e. all types used within the Enterprise Object Model, are represented as StateTypes. Other State Types which are not Managed Objects use this meta-object as well, but those are not generally relevant to the Data Model. They are only used internally to the system.

| | | |
|---|---|---|
| stateTypeName | MetaObjName | The name of the State Object type. |
| DisplayName | NLSString | Display name for the type. Does not include a namespace. |

Application-Specific State Type Qualifiers

| | | |
|---|---|---|
| Mappable (qualifier0) | bool | Whether or not the type should appear on a map. |

Certain state types are "significant" enough within the Enterprise Object Type System to be surfaced as a part of the core skeleton of that type model. Such state types are the "major" ones around which all others simply provide supporting detail. We refer to these types as "mappable", because within our applications we choose to display these types predominantly within our maps. The navigation through the data model in the applications centers around these object types.

Event Types

EventType is used to define each type of Event.

| | | |
|---|---|---|
| eventTypeName | MetaObjName | Name of this event type. |
| alertTypeName | MetaObjName | Type name of alert type associated with this Event Type, if any. If this Event type is not a DisplayableEvent (see below), this attribute should be set to NULL. |
| displayName | NLSString | Display name for the type. Does not include a namespace. |

Application-Specific Event Type Qualifiers

| | | |
|---|---|---|
| category (qualifier0) | Enum | The category to which this event type belongs. One of the following: BUSINESS - applies to business layer objects or concepts |

-continued

| | |
|---|---|
| | APPLICATION - applies to application layer objects or concepts |
| | INFRASTRUCTURE - applies to infrastructure layer objects or concepts |
| | ADMIN - applies to the administration or inner workings of the platform system |
| | (NULL) - not a displayable event. |

Events are categorized semantically within our applications, either according to which layer of the Enterprise Model they describe or whether or not they mark changes within our system.

The category of an event type parallels the inclusion of the event into a particular event type group (see below). Categories are maintained as a qualifier in addition to as an event type group to facilitate the display and filtering of events by category. For certain patterns query by event type group is more efficient, for others query by qualifier is more efficient.

Alert Types

Alert types are stored as their own category of meta-object by the system. Alert types are very similar to State Types in many respects, although they have no need for the State type qualifiers.

| | | |
|---|---|---|
| alertTypeName | MetaObjName | The name of the Alert type. |
| displayName | NLSString | Display name for the type. Does not include a namespace. |

Although in implementation and behavior Alert types are very close to State types, semantically they are much more closely related to Event types. There must be one Alert type for every Event type with is a DisplayableEvent. The Alert presents the end-user with the details of the Event and a workflow for administering the Event, whereas the Event type provides all of the specific underlying detail of the event represented by both types.

Association Types

Association types are directional in general, although not all associations need to be directional. For example, the "Contains" relationship between Managed Objects is directional (the parent contains the child, but not vice versa). You will see below that the Associatable Objects which are associated by a concrete Association are named the "source" and "destination". Directional associations are navigated from the source to the destination.

Because of this directionality, association types contain two types of display names: one which is used when reading the Association in the forward direction (from source to destination), and one which is used when reading it in the backward direction (vice versa). In cases where Associations are bidirectional, the forward name and the backward name will be the same, but both should still be specified.

| | | |
|---|---|---|
| assocTypeName | MetaObjName | The name of the association type. |
| forwardCaption | NLSString | Used to display the name of the association on the GUI when traversing from source to destination. |
| backwardCaption | NLSString | Used to display the name of the association on the GUI when traversing from destination to source. |

Attribute Definitions

Attribute definitions are objects used internally to the system to keep track of attribute types, names, and qualifiers.

They are not meta-objects themselves, but rather are used to further describe meta-objects which are types.

| | | |
|---|---|---|
| AttrName | string | The name of the attribute |
| displayName | NLSString | Used to display the name of the attribute in the GUI. |
| AttrType | Enum | See section on "Attribute Type System" below for values. |

Attribute Type System

Attributes can be of any of the following types.

TABLE 1

Attribute Type System

| Datatype | Meaning | Suffix | XServer type | DB type | XApp Type (see below) | Notes |
|---|---|---|---|---|---|---|
| String | Text | <none> or Name | STRING | VARCHAR or CLOB | String | Name is the suffix used for proper names that the user has supplied for display, so there is no need for localization. |
| Int | Integer | <none> | INTEGER | Numeric | long | |
| Double | Floating-point | <none> | REAL | Numeric | double | |
| Bool | boolean | <none> | BOOLEAN | CHAR(1) | "true" or "false" | |
| Timestamp | Point in time | DT | DATE TIME | Numeric | long (as in Date.getTime) | Java standard UTC long format, not time zone adjusted |
| Duration | Duration in time | Time | INTEGER | Numeric | long (as in Date.getTime) | Java standard UTC long format |
| UID | Unique ID of untyped reference | ID | EVENT, STATE, ASSOC, or ALERT (see below) | VARCHAR (36) | String (opaque) | Universally unique identifier for an object. Should always be treated as opaque. |
| NLSString | Localizable string | <none> | STRING | VARCHAR in localized look-up table | String | String whose contents must be localizable by the platform. Generally used when an integrator needs to supply the localized string during customization. |
| SeqNum | Sequence Number | Num | INTEGER | Numeric | long | A quantity which is a sequence number, or sometimes a count |
| Size | Size or length | Size | INTEGER | Numeric | long | The size or length of something. |
| Severity | Severity (see below) | <none>, or Code | SEVERITY | Numeric (code value) | Severity | An enumerated value for specifying a Severity. See below. |
| Priority | Priority (see below) | <none>, or Code | PRIORITY | Numeric (code value) | Priority | An enumerated value for specifying a Priority. See below. |
| Enum | Enumeration | <none> | STRING | VARCHAR | String | Elements of the enumeration vary. There is also |

TABLE 1-continued

Attribute Type System

| Datatype | Meaning | Suffix | XServer type | DB type | XApp Type (see below) | Notes |
|---|---|---|---|---|---|---|
| Time Window Set | Set of time windows | <none> | ARRAY | VARCHAR | String (XML) | always a localized, displayable version for each. String whose content represents periods of time during which an object is to be in a particular state. Used to represent maintenance windows and time windows within and SLO |

The first column lists the datatype which will be used in this document. The second column lists the conventional suffixes which are used for this type within our attribute naming conventions.

The XApp API always returns Strings. However, the types that we list in the "XApp Type" column are the types into which the GUI can safely convert that data. Also please note that XApp-defined "pseudo-attributes" types are not covered in the table above. Please see the separate specification on XApp column usage for details on pseudo-attributes.

The XServer treats UIDs as typed references. They can be of type EVENT, STATE, ASSOC, or ALERT. UIDs of one type cannot be used in places where other types are required.

Enumerated Types

Enumerated values are typically passed around the system as opaque string representations referred to as "enum" values.

There are two different types of enumerated types within the system: those which are ordered and those which are not. Ordered enumerated values are represented in the repository by their "code" value, an integer representation which can be used for comparison in sorting. Non-ordered enumerated values are represented in their string "enum" representation.

Generally speaking, enumerated values will need to be localized before display to the GUI. The system supports the localization of enumerations, both for the ordered and non-ordered variety. Localized display names for each enumerated value are stored within the repository as well.

The XApp API supports query of all three forms of enumerated values, as appropriate. Use the ":CODE" suffix to query the code value for an ordered enumeration. Use the ":TEXT" suffix to retrieve the localized, displayable form. The enum format can be obtained using the ":ENUM" suffix. The code values themselves should never be displayed within the GUI. They are only valuable for computing sorts or comparisons internally.

For example, for the "enum" representation of Severity value CRITICAL, the code value would be "100" and the text value would be "Critical" in English.

Some enumerations are fixed within the system, but others, such as severity and priority codes (see below) are open enumerations that can be customized to particular customer needs. The platform representation and mechanisms for such enumerations are the same as for the fixed variety. In the case of an open enumeration, integrators must supply the platform with localized versions of display strings for all novel values.

Severity Values

Severity values are predominantly used in one of two ways: as an objective measure of the localized impact of the event, or as a rating of the operational status of a managed object. They are an ordered enumerated type. As such, they should typically be passed around according to their "enum" representations.

TABLE 2

Severity Codes

| Severity (Enum value) | Code | Usage | Color | Meaning |
|---|---|---|---|---|
| UNKNOWN | 0 | Internal only | n/a | The severity cannot be determined. Should NEVER surface to the GUI. |
| INFO | 10 | Event | blue | Event is for informational purposes only. There is no change to operational status. |
| UNMONITORED | 14 | Object status | gray | System is unmonitored by any of the events which would ordinarily determine system status. |

TABLE 2-continued

Severity Codes

| Severity (Enum value) | Code | Usage | Color | Meaning |
|---|---|---|---|---|
| CLEAR | 15 | Event and obect status | green | System is operational. |
| WARNING | 50 | Event and object status | yellow | The system's operational status is in jeopardy, but it is still operational. |
| SEVERE | 80 | Event and object status | orange | The system's operations are severely impaired, but it is still operational. |
| MAINTENANCE | 85 | Event and object status | n/a | The system is unavailable because it is inside a maintenance window. |
| CRITICAL | 100 | Event and object status | red | The system is non-functional or inaccessible. |

Out of the box, we strive to maintain a semantic consistency between uses of the various severity codes. At the end of the day, however, the true meaning of the severity codes in a working system is pragmatically defined and relative to its contextual use. Sometimes we might define severity levels for relative display purposes: maybe we might want to define yellow/orange/red as shades of severity which don't exactly correspond to conventional meanings, just to have a ranking which can be visually distinctive. But we must be careful of doing this: if, for example, a customer sets all of his SLO threshold severity codes to be CRITICAL because he wants to drive home that SLO violations are all important, then the semantics of that severity level can start to lose its distinctiveness and clarity.

CRITICAL is a distinguished severity rating within the system because it is directly used in availability computation. Availability is defined as the percentage of time a given status is non-CRITICAL. Modelers should be aware of this when setting alert severities.

Integrators can define new enumerated elements if they so desire. They should be aware of which code value range into which they choose to place the new severity code, as this is where their new value will sort.

UNMONITORED is used in cases where alerts determine a status but no such alerts have been detected by the system. Business Status, for example, is a function of any Business Exceptions that are defined. So if none are defined on a particular Business Service, it's business status is UNMONITORED. Likewise, Application Status is defined only by application synthetic transactions (probes). So if no synthetic transactions are defined for the Managed Application Object, we should default all Application Status values to UNMONITORED. Then, when we get an injected event in, we can update the application status to a monitored value, and it will never be UNMONITORED again.

Priority Values

Priority values are an ordered enumerated type used in two distinct places: to indicate the relative importance of an alert, and also to indicate the relative importance ("criticality") of a managed object. Priority is a subjective measure which is under user control, whereas severity is an objective measure which is immutable by users. Note that priority is applied to alerts not to events themselves, which is consistent with the subjective vs. objective nature of alerts and events.

TABLE 3

Priority Codes

| Priority (Enum value) | Code |
|---|---|
| UNKNOWN | 0 |
| LOWEST | 1 |
| LOW | 25 |
| NORMAL | 50 |
| HIGH | 75 |
| HIGHEST | 100 |

Integrators can define new enumerated elements if they so desire. They should be aware of which code value range into which they choose to place the new priority code, as this is where their new value will sort.

State Type Attribute Definitions

State type attributes have three additional system-defined qualifiers which are not used for attributes of other types.

| Active | bool | Whether or not an event is fired when the value of this attribute changes. |
|---|---|---|
| computed | bool | Whether or not this is a computed attribute. |
| Archive | bool | Whether or not to collect a time series of historical values of this attribute. |

All of these qualifiers are set to a value of "false" for all concrete attributes listed in the object type system below unless explicitly specified to the contrary.

Active Attributes

Active attributes are attributes which are monitored by they system. Whenever there is a change to the value of an active attribute, an AttributeChangeEvent is fired.

This mechanism is useful for keeping a record of changes to an attribute over time. It is not recommended that policy writers use active attribute events to trigger policies, as this is considerably less efficient than using a state type attribute trigger.

The current platform implementation restricts us to declaring attributes to be active at type level only. Future implementations should be able to declare active attributes at the granularity of individual object instances.

Computed Attributes

Computed attributes do not have values that are stored directly in the repository. Rather, the system associates a script along with this attribute definition which gets executed whenever this attribute is queried. The script is generally a function of other attributes, either on the same managed object or not. Computed attributes can also be expressed in terms of other computed attributes. The result of the script's computation is the value which is returned upon query.

Attribute Archiving

When the "archive" qualifier is set to true for an attribute, the platform maintains a historical archive of values for that attribute.

The current platform implementation restricts us to declaring attributes to be archived at type level only. Future implementations should be able to declare archived attributes at the granularity of individual object instances.

Application-Specific State Type Attribute Qualifiers

Our GUI applications make use of the following qualifiers:

| | | |
|---|---|---|
| category (qualifier0) | Enum | The category to which this attribute belongs. One of: BUSINESS - applies to business layer objects or concepts APPLICATION - applies to application layer objects or concepts INFRASTRUCTURE - applies to infrastructure layer objects or concepts ADMIN - applies to the administration or inner workings of the platform system |
| advanced (qualifier1) | bool | Whether or not the GUI should only show this attribute value in the "Advanced" area. (May not be implemented for Beta1.) |
| sliCompatible (qualifier2) | bool | Whether or not this attribute is eligible to become a Service Level Indicator for use in Service Level Objectives. |

Unless stated explicitly to the contrary in the Enterprise Object Type Model below, you can assume the following values as defaults for the application-specific qualifiers:

| | |
|---|---|
| sliCompatible | False |
| advanced | False |

Internal State Objects don't need to have application-specific qualifiers associated with them, as they are never surfaced to the applications.

Attributes vs. Properties

Attributes are data objects which are associated with state object, event, or alert instances within our data model. A type is defined by the set of attributes which are associated with that type (as well as the semantics of the type name itself). The set of attributes on a type implicitly define that type. Attributes are typed.

Properties are attributes which are stored directly within the columns of a data model object's native tables within the repository database, e.g. state object attributes are stored directly as columns in the state object table. Attributes which are not properties are stored within the "attribute table". The distinction between properties and attributes are purely internal to the system, and is included for optimization purposes. However, from the application's perspective, the concept of properties doesn't exist; both properties and attributes are both regarded as "attributes". Meta-objects only have associated properties, not attributes.

Note: all UML object attributes represent Attributes in our data model. They are never represented as separate objects, even though that would be a more accurate UML representation of our implementation. Properties are labeled with "(prop)" in our UML.

Policies

Policies are meta-objects in their own right. There are no "types of policies".

Details of how policies are defined are left to another specification. Here, we only define the attributes of policies which are visible from alert queries.

| | | |
|---|---|---|
| policyName | MetaObjName | Name of this policy. |
| RuleDescr | NLSString | Verbose, human-readable description of the rules contained within this policy. The "description" property contains a terse description of the policy. |

-continued

| | | |
|---|---|---|
| policyName | MetaObjName | Name of this policy. |
| displayName | NLSString | Display name for the type. Does not include a namespace. |

Standards and Formal Rules—Naming

Class names and attributes follow the Java naming conventions: Class names have the first letter of each sub-word capitalized. Attribute names are the same, other than that the first letter is always lowercase. String comparison of class names and attribute names within our system are always case-sensitive.

Attributes vs. Associations

As a general rule, if there is some bit of information which can be derived through the navigation of an association, we don't define an attribute which expresses the same bit of information. For example, if there is an association between an IPInterface and an object, there is no reason to have an "ipInterface" attribute, so long as the association is navigable.

Managed Domain

Figure 2:
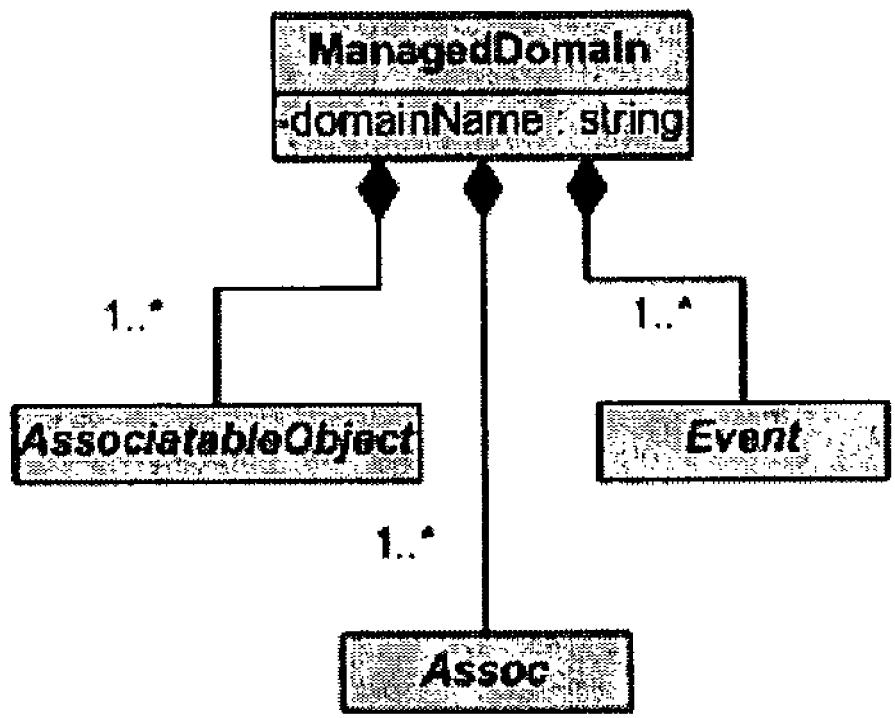
FIG. 2 is a block diagram illustrating a managed domain according to an embodiment of the invention.

FIG. 2 is a block diagram illustrating a managed domain according to an embodiment of the invention. A managed domain is the complete set of state objects, events, and associations represented within the data model. Maps one-to-one with a single set of system Repositories. There are other aspects of what constitutes a domain, discussed hereafter.

Type Inheritance and Type Customization Patterns

When we use the metaphor of "inheritance" in this specification, it does not represent true inheritance in the fullest object oriented sense. There is no polymorphic quality to this inheritance. Rather, it can be rather narrowly defined in the following two ways:
1. Abstract types represent state type groups. As such, our system supports querying for all of the object instances (or types) within that group. This mimics inheritance from a query perspective. So in the GUI, for example, it is possible to query on a state type group and display all of the instances therein, just as if we supported true inheritance.
2. Initialization scripts for abstract types should be called from initialization scripts for their subclasses. An initialization script is quite like a constructor for an object. It is a place where attributes can be initialized with default values. So much like an inherited class calls super( ) in Java to do any superclass initialization, our initialization scripts will be hard-coded to call the initialization scripts of their parent classes. State type groups don't have initialization scripts, so what we do instead is name a JML module after the state type group name, and call the superInitScript( ) method within that module. These scripts, in turn, are responsible for calling any of their own superclass scripts.

Figure 3:
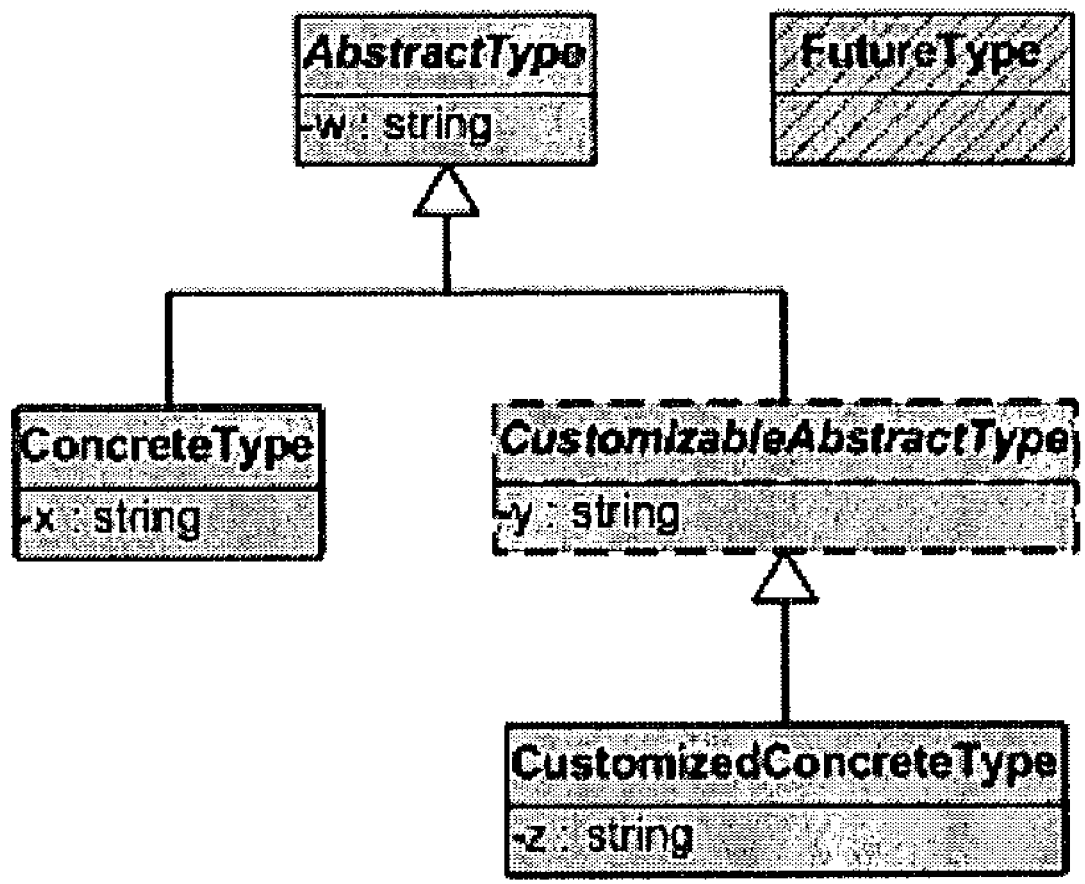
FIG. 3 is a block diagram that illustrates type inheritance and customization.

Another difference between our scheme in practice and true initialization is that all attributes are actually defined at the leaves of the inheritance tree, rather than in any intermediate superclasses. Take, for example, the situation depicted in FIG. 3. FIG. 3 is a block diagram that illustrates type inheritance and customization.

When type ConcreteType is defined, it defines both attribute x and attribute was part of its type definition script. There is no inheritance of attributes through type definition. Including the attribute inside an abstract type in the UML is our shorthand for saying that the attribute should be included in all subclass definitions.

Since state type groups are not real types, they also cannot be concrete. This is another limitation that would not be present in a true inheritance model.

Abstract types are represented in the UML with type names rendered in italics. Concrete types have names in normal script. Any types which are shaded with diagonal lines represent types that we will most likely implement in future releases.

Nothing prevents our model from evolving into a true inheritance model in the future. Nor would any parts of this model specification need to change in order to support this. These qualifications of what is meant by inheritance are simply a matter of what our current platform implementation can support (and what it cannot) during this specific release.

A recurring pattern within our data model is the creation of a novel type whenever a new set of attributes must be added to an abstract type for customization purposes. This pattern is applied both in places where the new type is legitimately a type (i.e. when there will be multiple instances sharing the type), and also in places where singleton objects need to add customized attributes. For example, if we ever want to add a new monitored metric to an object, we create a new type to accommodate the new attribute.

Abstract types which need to be extended through customization at specific customer sites are expressed with dotted lines around them in the UML. We don't draw any concrete subtypes underneath them in the drawings below, because they can't be predicted until we perform actual customization. In the diagram above, CustomizableAbstractType is an abstract type that we might define here in this spec. Policies and GUIs can count on any objects within that type group to support all attributes from that type upwards (in this case, attributes y and w). When our consultant performs customization, he decides a concrete subtype CustomizedConcreteType needs to add an attribute z, so he defines that type to include attributes w, y, and z, and then calls the appropriate superInitScript( ) for CustomizableAbstractType.

Associations

Figure 4:
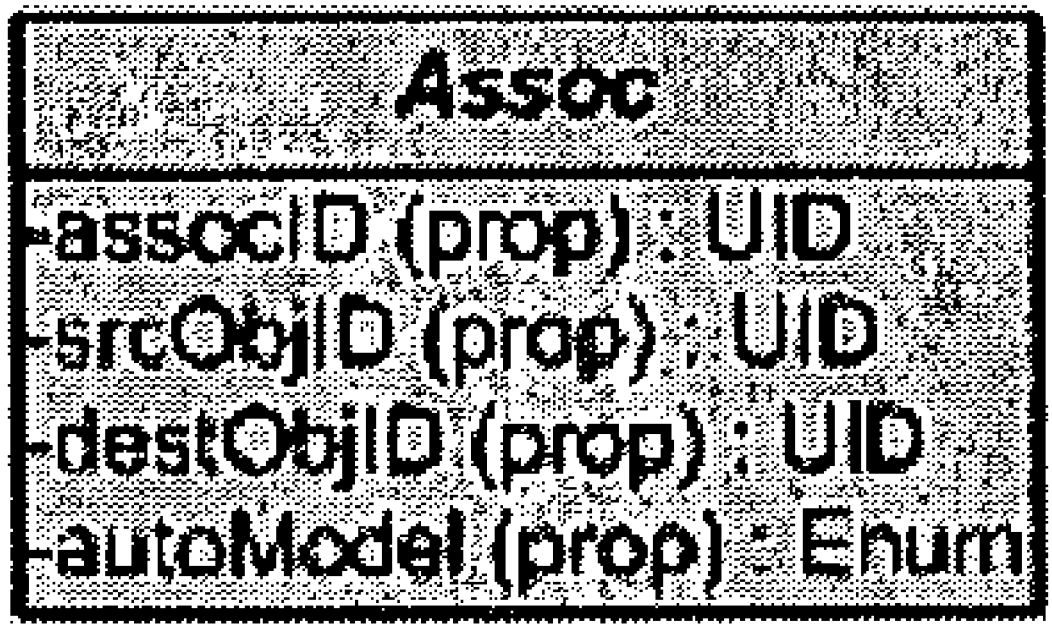
FIG. 4 illustrates a base association type, according to an embodiment of the invention.

The Assoc abstract class contains attributes common to all associations in the system. FIG. 4 illustrates a base association type, according to an embodiment of the invention.

Assoc—a named, ordered association (relationship) between two UIDs. Associations within the Application Model are between two Associatable Objects, either two Managed Objects or two Alerts.

| assocID | UID | Unique identifier for the association |
|---|---|---|
| srcObjID | UID | Element which comes first in the order of the association. |
| destObjID | UID | Element which comes second in the order of the association. |
| autoModel | Enum | Indicates how the association was modeled into the system. One of:<br>MANUAL - association was explicitly modeled by the user<br>UNCONFIRMED - association was modeled automatically, but that has not yet been manually confirmed by a user.<br>CONFIRMED - association was modeled automatically and manually confirmed by a user. (Not for Beta1.) |

Note: our Associations are depicted in UML as UML associations, and not as separate objects, which would be a more accurate UML representation of our implementation.

Enterprise Object Type System—Core Types for Managed Objects and State Objects

Figure 5:
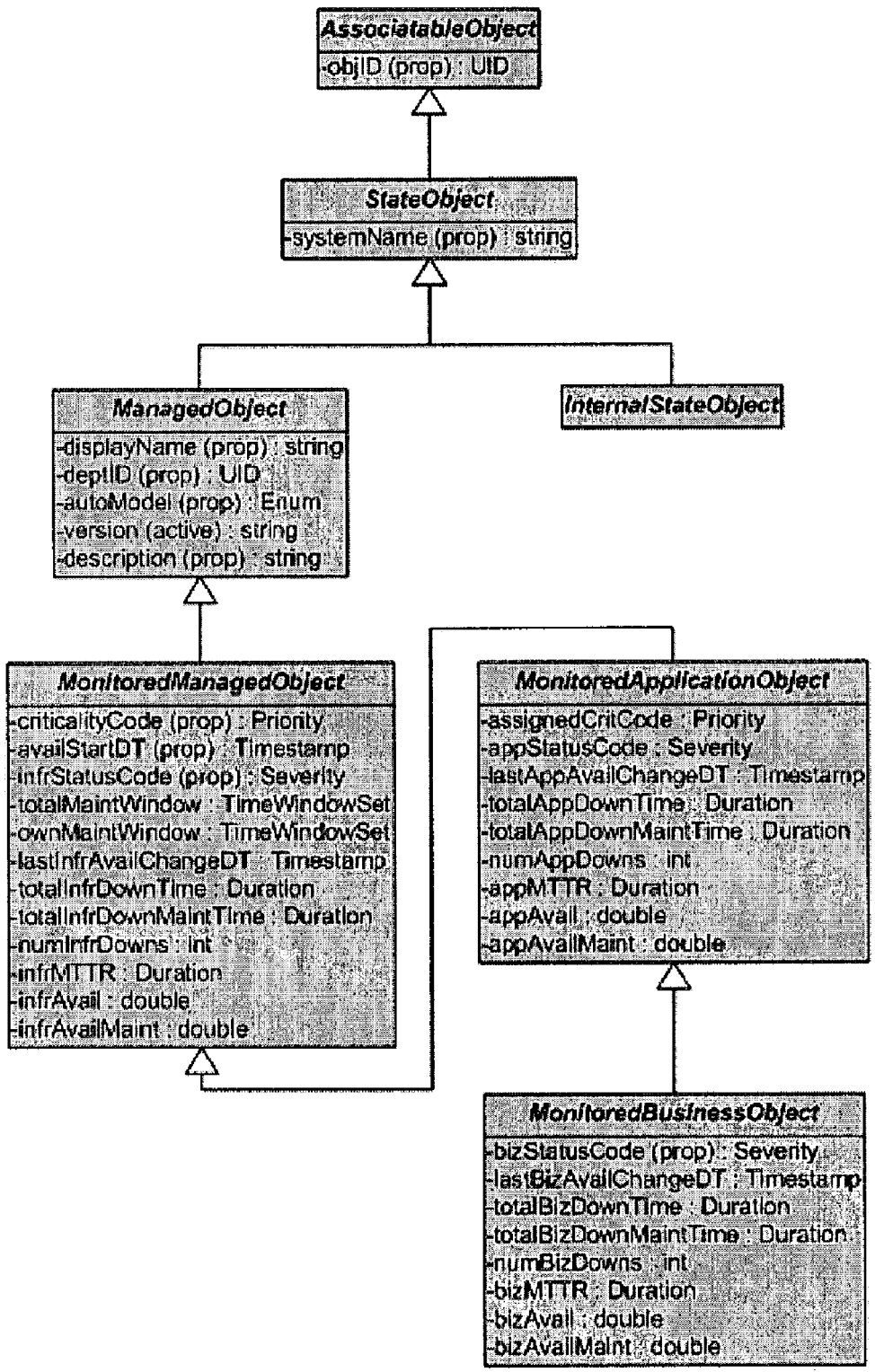
FIG. 5 is a block diagram of a State Core Type Model, according to an embodiment of the invention.
Figure 6:
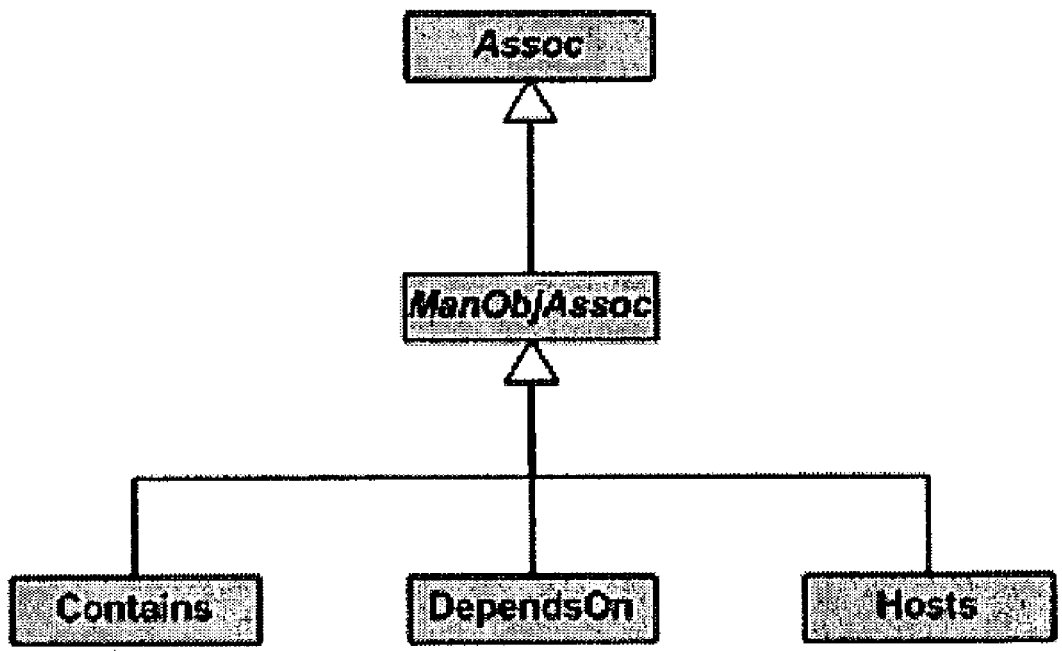
FIG. 6 is a block diagram illustrating managed object association types, according to an embodiment of the invention.

Top-level concepts appear in the Enterprise Object Type System UML diagrams, such as the State Core Type Model illustrated in FIG. 5.

Associatable Object—any entity which can be referred to by an Association. Currently, the known subtypes are State Objects and Alerts.

| objID | UID | ADMIN | Unique identifier for the state obect or alert |
|---|---|---|---|

State Object—any entity which can be stored within XRepository according to the State Object schema.

| systemName | String | ADMIN | Internal name for the obect. Unique within type. |
|---|---|---|---|

Managed Object—any entity within our Application Model which is directly manageable and visible within our applications. All managed objects must be discovered in some way (albeit some may be modeled, i.e. manually discovered).

| | | | |
|---|---|---|---|
| displayName | String | ADMIN | Name used to display the object within the GUI. |
| deptID | UID | ADMIN | Index of the smallest department associated with this managed object. NOTE: this is the way that we represent the "Contains" relationship between Departments and Managed Objects within our model, rather than through an association. |
| autoModel | Enum | ADMIN | Indicates how the association was modeled into the system. One of:<br>MANUAL - association was explicitly modeled by the user<br>UNCONFIRMED - association was modeled automatically, but that has not yet been manually confirmed by a user.<br>CONFIRMED - association was modeled automatically and manually confirmed by a user. (Not for Beta1.) |
| version | string | ADMIN, ACTIVE | Used to keep track of object updates and revisions. The system does not impose any conventions on how versions should be formatted, nor does the system interpret any ordering between different values. Interpretation is left to the user. |
| description | string | ADMIN | Human-readable description of the managed object |

Internal State Object—any state object which is not directly visible within the Enterprise Model. Examples of these are state objects which policies create and rely upon to maintain their own internal state.

Monitored Managed Object—any managed object for which the system is capable of monitoring infrastructure operational status.

| | | | |
|---|---|---|---|
| criticalityCode | Priority | ADMIN | Derived indication of the business importance of the Managed Object. This is the value that the priority will default to for any alert associated with this object. |
| availStartDT | Timestamp | ADMIN | Reference start time from which all flavors of availability data is computed. |
| totalMaintWindow | TimeWindowSet | ADMIN, COMPUTED | The total cumulative maintenance window associated with this object, or NULL if there is none. Computed from the maintenance windows for all objects upon which this depends. |
| ownMaintWindow | TimeWindowSet | ADMIN | The maintenance window associated with this object itself, or NULL if there is none. |
| infrStatusCode | Severity | INFR | Operational status of the object from a bottom-up infrastructural perspective. E.g. CRITICAL (for a down status), CLEAR (for an up status). |
| lastInfrAvailChangeDT | Timestamp | INFR | The last time there was an infrastructure availability change, i.e. from CRITICAL to some other status, or vice versa. |
| totalInfrDownTime | Duration | INFR | Total time duration that infrastructure status is CRITICAL for this object, excluding MAINTENANCE time, and excluding the current period if the object is currently CRITICAL |
| totalInfrDownMaintTime | Duration | INFR | Total time duration that infrastructure status is CRITICAL for this object, |

-continued

| | | | |
|---|---|---|---|
| numInfrDowns | int | INFR | including MAINTENANCE time, and excluding the current period if the object is currently CRITICAL Number of times infrastructure status has been CRITICAL, including the current period if the object is currently CRITICAL |
| infrMTTR | Duration | INFR, COMPUTED | Mean-time-to-repair with respect to infrastructure status |
| infrAvail | double | INFR, COMPUTED | Availability with respect to infrastructure status, excluding MAINTENANCE time. Stored as a percentage to three decimal places precision. |
| infrAvailMaint | double | INFR, COMPUTED | Availability with respect to infrastructure status, including MAINTENANCE time. Stored as a percentage to three decimal places precision. |

Monitored Application Object—a Monitored Managed Object for which the system can maintain application status

| | | | |
|---|---|---|---|
| assignedCritCode | Priority | APP, ADVANCED | Direct indication of the business importance of the Managed Object. This value is used to determine the value of criticalityCode for this object and all objects upon which this object depends. |
| appStatusCode | Severity | APP | Operational status of the object from an application user's perspective. |
| lastAppAvailChangeDT | Timestamp | APP | The last time there was an application availability change, i.e. from CRITICAL to some other status, or vice versa. |
| totalAppDownTime | Duration | APP | Total time duration that application status is CRITICAL for this object, excluding MAINTENANCE time, and excluding the current period if the object is currently CRITICAL |
| totalAppDownMaintTime | Duration | APP | Total time duration that application status is CRITICAL for this object, including MAINTENANCE time, and excluding the current period if the object is currently CRITICAL |
| numAppDowns | int | APP | Number of times application status has been CRITICAL, including the current period if the object is currently CRITICAL |
| AppMTTR | Duration | APP, COMPUTED | Mean-time-to-repair with respect to application status |
| AppAvail | double | APP, COMPUTED | Availability with respect to application status, excluding MAINTENANCE time. Stored as a percentage to three decimal places precision. |
| appAvailMaint | double | APP, COMPUTED | Availability with respect to application status, including MAINTENANCE time. |

| | | | Stored as a percentage to three decimal places precision. |
|---|---|---|---|

Monitored Business Object—a Monitored Managed Object for which the system can maintain business status

| | | | |
|---|---|---|---|
| BizStatusCode | Severity | BIZ | Business status of the object determined as by a max function over all current Business Exception statuses for this object, or UNMONITIORED if there are no Business Exceptions defined. |
| lastBizAvailChangeDT | Timestamp | BIZ | The last time there was an business availability change, i.e. from CRITICAL to some other status, or vice versa. |
| totalBizDownTime | Duration | BIZ | Total time duration that business status is CRITICAL for this object, excluding MAINTENANCE time, and excluding the current period if the object is currently CRITICAL |
| totalBizDownMaintTime | Duration | BIZ | Total time duration that business status is CRITICAL for this object, including MAINTENANCE time, and excluding the current period if the object is currently CRITICAL |
| numBizDowns | int | BIZ | Number of times business status has been CRITICAL, including the current period if the object is currently CRITICAL |
| BizMTTR | Duration | BIZ, COMPUTED | Mean-time-to-repair with respect to business status |
| BizAvail | double | BIZ, COMPUTED | Availability with respect to business status, excluding MAINTENANCE time. Stored as a percentage to three decimal places precision. |
| bizAvailMaint | double | BIZ, COMPUTED | Availability with respect to business status, including MAINTENANCE time. Stored as a percentage to three decimal places precision. |

State Object Addressability

There are three ways to uniquely identify a State Object within our system:

1. UID—universally unique way of identifying the state object. Used internally to the system. UIDs are NEVER displayed on the GUI.
2. Object Display Name and Object Type—object display names are unique within their respective types, so this pair of data is often used to identify an object as well. This methodology is often used between XApp and the XServer.
3. [Internal only] Object System Name and Object Type—object system names are also unique within their types, but their use is restricted to internal system use. XApp clients should never use or even have access to system names.

Availability Attributes

Availability is defined as the percentage of the time that a given flavor of status (infrastructure, application, or business) is not CRITICAL. Availability attributes come in sets according to which flavor of status they represent. Each of the sets contain a parallel set of attributes.

1. A status code (e.g. infrStatusCode): reflects the current status of the object, of the appropriate flavor
2. The time that the availability status last changed (e.g. lastInfrAvailChangeDT)
3. Total downtime (e.g. totalInfrDownTime): total time the status was CRITICAL
4. Total downtime including maintenance time (e.g. totalInfrDownMaintTime): total time the status was either CRITICAL or MAINTENANCE
5. Number of downtime outages (e.g. numInfrDowns): number of distinct occurances when the status was CRITICAL The attributes for each flavor are named according to the same naming patterns. The only difference is that for infrastructure availability the abbreviation "infr" is used; for application availability "app" is used; and for business availability "biz" is used.

These basic metrics are then used in the computation of MTTR and availability metrics. Availability metrics are available with or without taking maintenance time into account.

All three sets share the same availability start time (availStartDT) and maintenance window, defined within the MonitoredManagedObject attributes, no matter what flavor of availability is being computed.

Managed Object Associations

ManObjAssoc—a categorization of all managed object association types. There is no requirement for an "association type group" at this time, but if one arises, this would be a candidate.

Contains—the source object is a container for the destination object, but the destination object's life cycle is not dictated by the container.

Depends On—the source object needs the destination object in order to function properly.

Hosts—the destination object cannot exist without the source object. Were the host to be removed, the hosted objects would go away as well. IMPORTANT NOTE: A hosting association also implies a dependency association (running in the opposite direction) from an operational perspective.

These three basic Associations can be directly read out of the Application Model UML, according to the following legend:

TABLE 4

Associations in UML

| UML Notation | Association in Application Model |
| --- | --- |
| Containment (unfilled diamond) | Contains |
| Composition (filled diamond) | Hosts |
| Dependency (dotted line) | Depends On |

Infrastructure Status Propagation and Associations

The different managed object associations have different implications on infrastructure propagation.
1. Infrastructure status always propagates directly along dependency lines. Since the "hosts" relationship implies dependency, propagation works the same way for that relationship (although it flows in the opposite direction).
2. Containment relationships have to have propagation rules explicitly coded into policy during customization. Our system does not yet model enough metadata to drive built-in policies to handle all scenarios for containment propagation.

Layers within the Model

Figure 7:
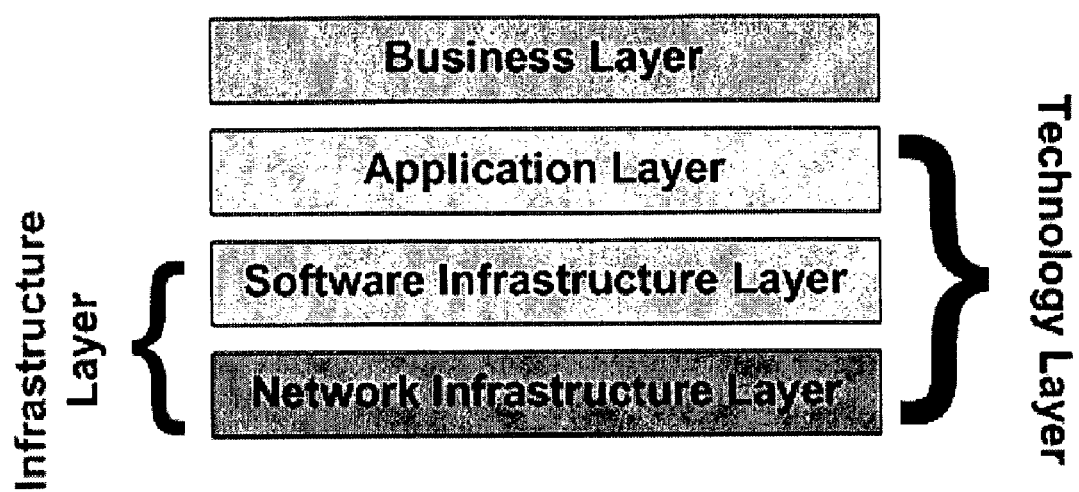
FIG. 7 is a block diagram illustrating various application model layers, according to an embodiment of the invention.

FIG. 7 is a block diagram illustrating various application model layers, according to an embodiment of the invention.

Network Infrastructure Layer—Collection of the physical Hosts, Routers, and other networking elements within the domain. Also includes the individual IP interfaces associated with each. This layer is discoverable by means of an adapter to a conventional Network Management System.

Software Infrastructure Layer—Collection of Enterprise Servers which can host Application Components, including the deployed components themselves. Logically sits above the Network Layer. Enterprise Servers map directly onto elements of the Network Layer. Examples of concrete Enterprise Servers which live in this layer are Web Servers, Database Servers, and Application Server; examples of corresponding components are Web Services, Data Services, and EJBs. This layer is discoverable by means of an adapter to any System Management System which is capable of managing a given Enterprise Server type.

Infrastructure Layer—includes both the Network Infrastructure and Software Infrastructure layers.

Application Layer—Collection of Applications and their constituent Application Services. Logically sits above the Software Infrastructure Layer, upon which the elements of this layer map directly. This layer must be explicitly modeled by a user who is familiar with the structure and deployment of the actual application.

Note: Certain management applications might sometimes visualize Application Components within the Application layer, to which they abstractly belong. However, in one embodiment they are strictly discovered within the Infrastructure Layer. Therefore, relative to that embodiment, they properly belong to that layer, and not to the Application Layer.

Technology Layer—includes both the Infrastructure and Application Layers. This term is usually used to compare or contrast with the Business Layer.

Business Layer—Layer that sits above the Application Layer where business services and activities are modeled by a user who wants to manage the Business Services which are enabled by Applications.

Network Infrastructure Layer Objects

Figure 8:
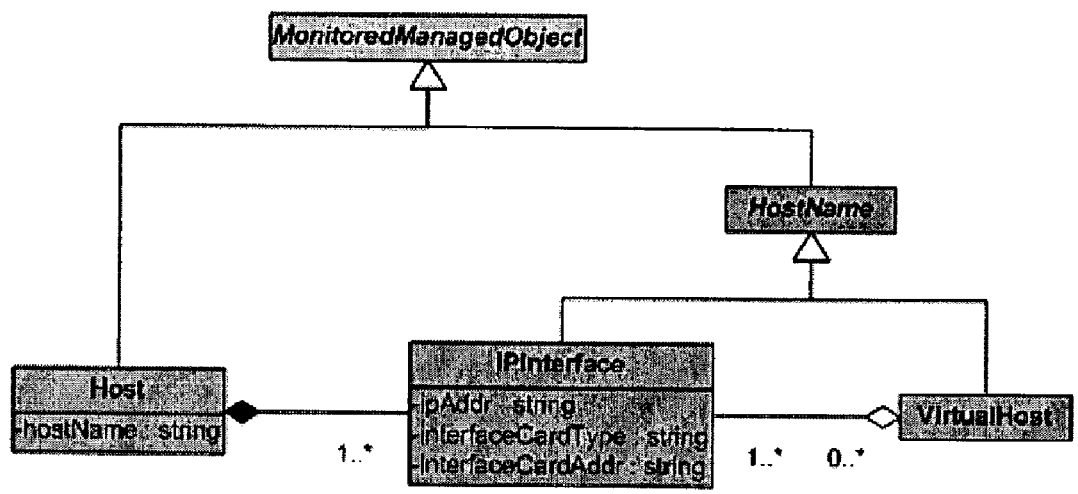
FIG. 8 is a block diagram illustrating various Network layer entities, and their relationship to a Monitored/Managed Object.

FIG. 8 is a block diagram illustrating various Network layer entities, and their relationship to a Monitored/Managed Object.

Host—a hardware entity, such as a computer, which has at least one IP Interface. Hosts which are servers are managed objects. Clients are not managed, and so do not fall within our model.

| hostName | string | INFR | The name of the host. Differs from systemName in that the systemName is based on internal keys used during discovery, while this is the name of the host from an external perspective. |
| --- | --- | --- | --- |

IP Interface—One logical IP interface, along with its status. Hosts can have multiple IP Interfaces, each with its own status. Some IP interfaces (such as Client source nodes within an OperArc, see below) aren't managed, but all IP interfaces associated with managed Hosts are managed.

| IpAddr | string | INFR | The IP Address of the IPInterface. Differs from systemName in that the systemName is based on internal keys used during discovery, while this is the name of the IP interface from an external perspective. |
| --- | --- | --- | --- |
| interfaceCardType | string | INFR | Type of interface card that hosts the IP Interface, e.g. "Ethernet-CSMACD" |
| interfaceCardAddr | string | INFR | MAC address of the interface card that hosts the IP Interface. |

Note: the IP address of the IP Interface should be stored in the systemName attribute.

Virtual Host—a collection of multiple IP Interfaces under one single logical name. For example, "www.amazon.com" might map to multiple IP Interfaces when used within a URL.

Host Name—a logical address, which is either an IP Interface or a Virtual Host. For example, these can be used interchangeably within a URL.

Figure 9:
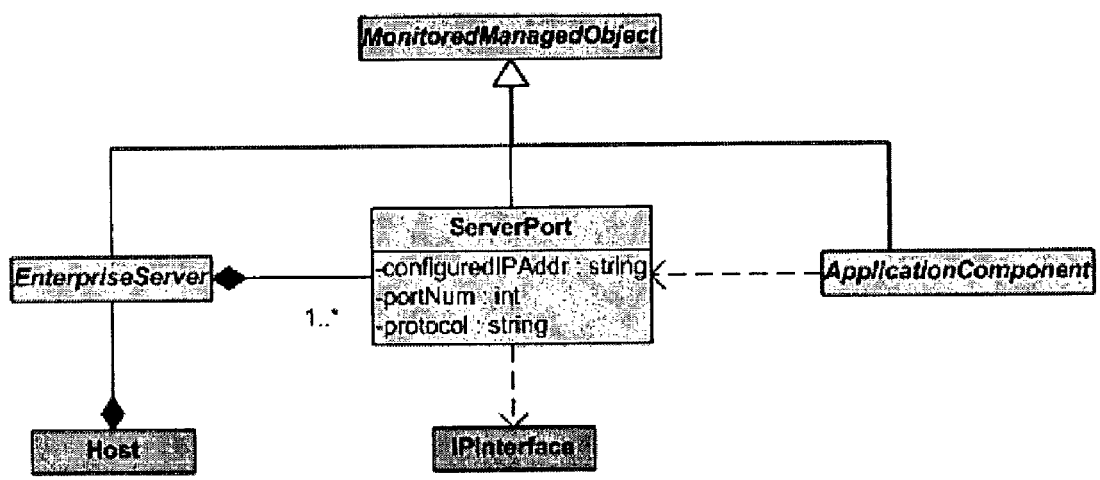
FIG. 9 is a block diagram that illustrates infrastructure layer entities, and their relationship to network layer entities and the Monitored/Managed Object.

Software Infrastructure Layer Objects—Software Infrastructure Objects and Components FIG. 9 is a block diagram that illustrates infrastructure layer entities, and their relationship to network layer entities and the Monitored/Managed Object.

Enterprise Server—abstract type (state type group) for any software entity which is capable of executing or hosting Application Components. Enterprise servers are purely infrastructural; in and of themselves, they offer no application-specific logic. Examples are a Web Server and a Database Server. Each Enterprise Server is a particular instance of the type of server in question, with a specific IP Interface and TCP port number.

Server Port—an address and protocol pair supported by an Enterprise Server. One Enterprise Server can support multiple Server Ports.

| configuredIPAddr | string | INFR | IP address that the Server Port is configured for, not the actual IP Interface upon which it depends |
|---|---|---|---|
| PortNum | int | INFR | Port number for the Server Port |
| Protocol | string | INFR | Protocol that the Server Port supports, e.g. "HTTP". |

Application Component—a coherent piece of software code and/or metadata which is host-able (and generally executable) within an Enterprise Server and which contributes some measure of an application's business logic. Examples are Web Services, EJBs, Servlets, and Databases. Application Components are always hosted on an Enterprise Server which contains a Server Port of an address which corresponds to the Application Component's own address.

Certain management applications might sometimes visualize Application Components within the Application layer, to which they abstractly belong. However, according to one embodiment, they are strictly discovered within the Infrastructure Layer. Consequently, relative to that embodiment they properly belong to that layer, and not to the Application Layer.

Note that not all Application Components are discoverable within an Enterprise Server (e.g. PL/SQL entry points). Also, we don't need to (necessarily) model any or all discoverable Application Components in order for our Application Model to be complete or coherent. However, all Application Components which do appear within our model must be discoverable.

Figure 10:
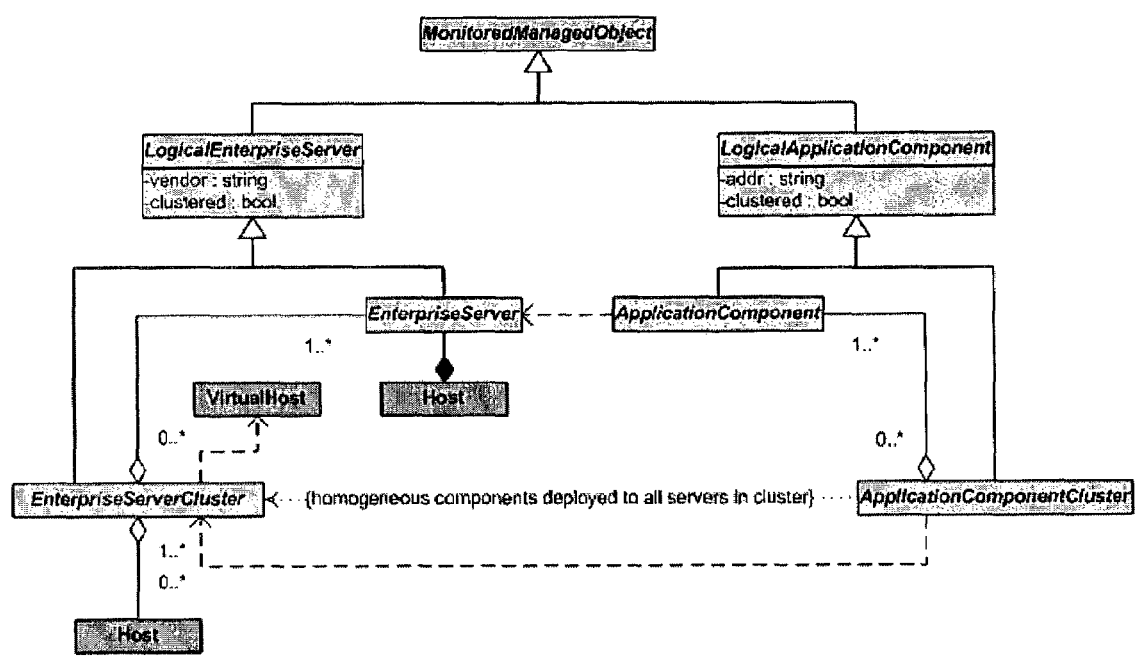
FIG. 10 is a block diagram illustrating Infrastructure Core Object Types according to an embodiment of the invention.

FIG. 10 is a block diagram illustrating Infrastructure Core Object Types according to an embodiment of the invention.

A cluster is an (approximately) homogeneous set of distributed application components or distributed enterprise servers that act as a single logical entity. They are typically configured this way to provide higher availability or a quality of service.

The associations that you see in the diagram above are not actual concrete associations within the Enterprise Object Type System, but rather describe the patterns that many concrete types follow. For example, there is a concrete dependency between Web Service and Web Server, but as our model doesn't support "abstract associations", there is no actual concrete dependency between Application Component and Enterprise Server as pictured above.

Logical Enterprise Server—a state type group for grouping clustered and stand-alone Enterprise Servers.

| vendor | string | INFR | Name of the vendor supplying the Enterprise Server, e.g. "Oracle" for an Oracle DB. |
|---|---|---|---|
| clustered | bool | INFR | Whether or not the server is a stand-alone enterprise server which is a part of a cluster. Clusters themselves have this set to "false". Querying with a filter stipulating that clustered is "true" will return all the top-level logical enterprise servers without the ones that occur within a cluster. |

Enterprise Server Cluster—a grouping of Enterprise Servers (of homogenous sub-type) which are configured to work together and which can be accessed via a single VirtualHost address.

Logical Application Component—a state type group for grouping clustered and stand-alone Application Components.

| addr | string | INFR | The address at which the component can be accessed. The format of this address varies from component sub-type to sub-type. |
|---|---|---|---|
| clustered | bool | INFR | Whether or not the component is a stand-alone application component which is a part of a cluster. Clusters themselves have this set to "false". Querying with a filter stipulating that clustered is "true" will return all the top-level logical application components without the ones that occur within a cluster. |

Figure 11:
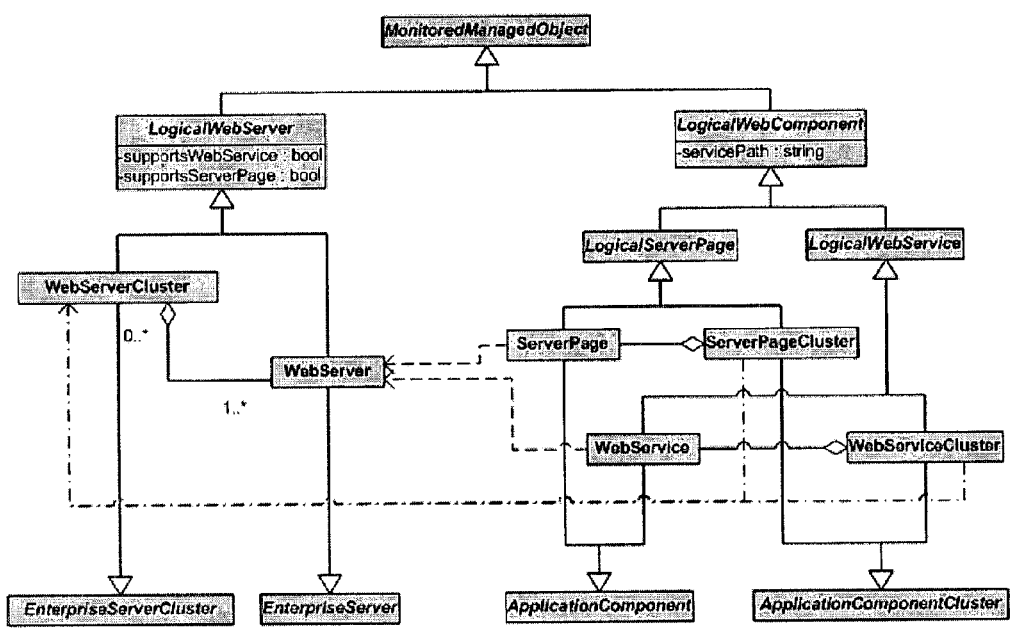
FIG. 11 is a block diagram that illustrates Web Server Infrastructure Objects, according to an embodiment of the invention.

Application Component Cluster—a homogenous grouping of Application Components which can be accessed via a single address and which collaborate together to provide some higher quality of service (such as the ability to handle greater loads, load-balancing, or failover) than an individual Application Component could provide. Requests sent to an Application Component Cluster get routed to one of the Application Components within that cluster. A concrete example would be a cluster of Web Services. FIG. 11 is a block diagram that illustrates Web Server Infrastructure Objects, according to an embodiment of the invention.

Logical Web Server—a state type group for grouping clustered and stand-alone Web Servers. The "supportsWebService" attribute is true when the Web Server can support Web Services (i.e. SOAP). The "supportsServerPage" attribute is true when the Web Server can host JSPs or ASPs.

| supportsWebService | bool | INFR | Whether or not this Web Server can host components that communicate via SOAP, e.g. Web Services. |
|---|---|---|---|
| supportsServerPage | bool | INFR | Whether or not this Web Server can host a JSP/Servlet or ASPs. |

Web Server—an Enterprise Server which supports the HTTP and other related Web protocols.

Web Server Cluster—an Enterprise Server Cluster of Web Servers.

Logical Web Component—as state type group which combines all Logical Server Pages and Logical Web Services

| | | | |
|---|---|---|---|
| servicePath | string | INFR | Any connection information, other than IP address and port number, which is specific to the Web Component type. |

Logical Server Page—a state type group for grouping clustered and stand-alone Server Pages Server Page—an Application Component which presents dynamic web content, e.g. Servlet/JSP, ASP, etc.

Server Page Cluster—an Application Component Cluster of Server Pages

Logical Web Service—a state type group for grouping clustered and stand-alone Web Services.

Web Service—an Application Component which satisfies the Web Services standard

Web Service Cluster—an Application Component Cluster of Web Services

Static Web Page—an application component which presents static web content, e.g. HTML.

Figure 12:
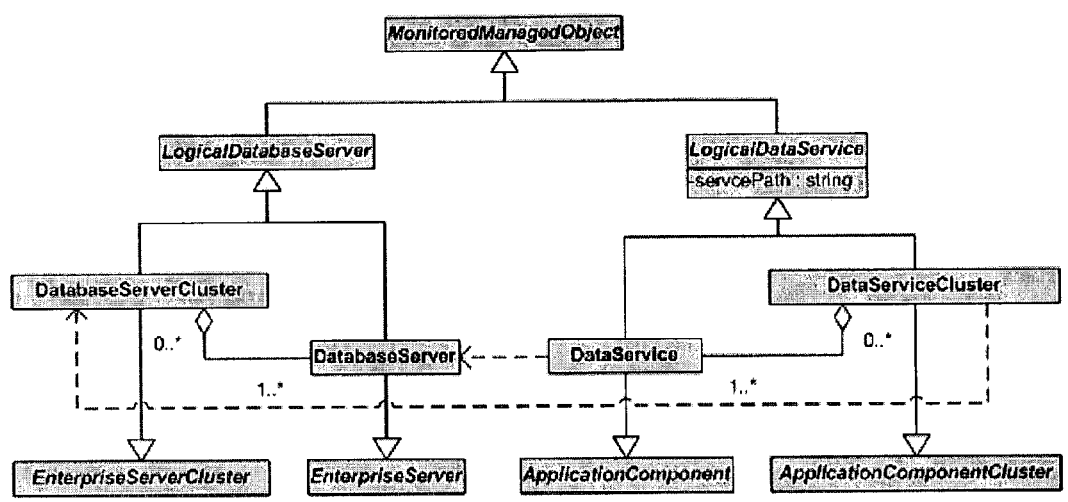
FIG. 12 is a block diagram illustrating database server infrastructure objects, according to an embodiment of the invention.

FIG. 12 is a block diagram illustrating database server infrastructure objects, according to an embodiment of the invention.

Logical Database Server—a state type group for grouping clustered and stand-alone Database Servers.

Database Server—an Enterprise Server which can host Data Services

Database Server Cluster—an Enterprise Server Cluster of Database Servers.

Logical Data Service—as state type group for grouping clustered and stand-alone Data Services

| | | | |
|---|---|---|---|
| servicePath | string | INFR | Any connection information, other than IP address and port number, which is specific to the Data Service. E.g. an Oracle SID. |

Data Service—an Application Component which acts as a persistent store for an application.

Data Service Cluster—an Application Component Cluster of Data Services.

Figure 13:
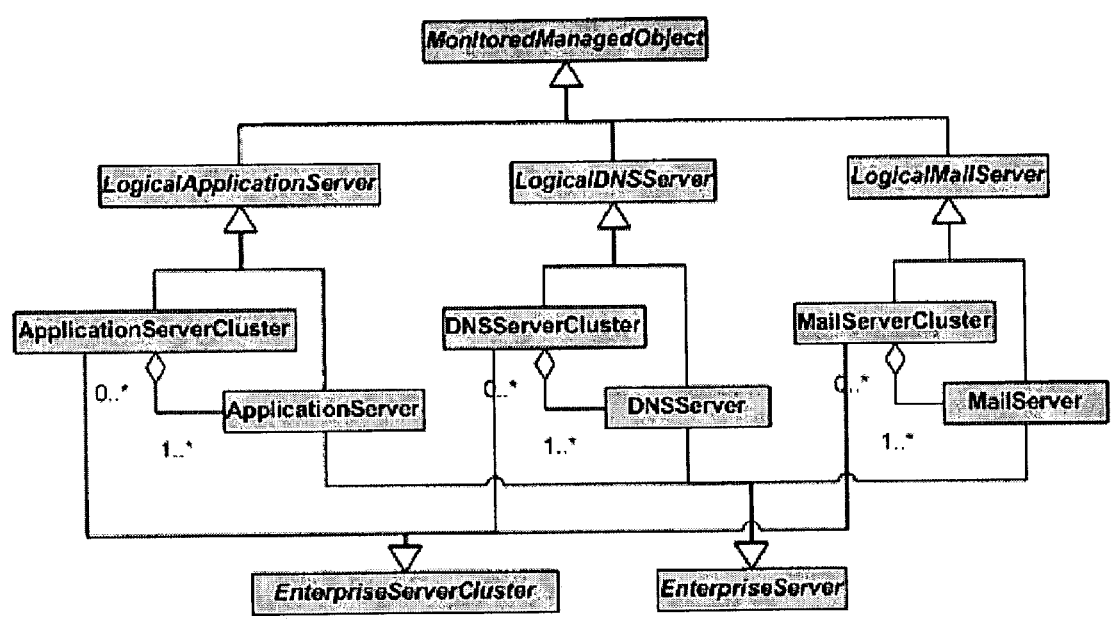
FIG. 13 is a block diagram illustrating various Enterprise Server Objects, according to an embodiment of the invention.

FIG. 13 is a block diagram illustrating various Enterprise Server Objects, according to an embodiment of the invention.

NOTE: all of the Enterprise Server types included in this section are not introduced along with corresponding Application Components. They are included in the system for status monitoring purposes only.

Logical Application Server—a state type group for grouping clustered and stand-alone Database Servers.

Application Server—an Enterprise Server which can host Enterprise Java Beans (EJB).

Application Server Cluster—an Enterprise Server Cluster of Application Servers.

Logical DNS Server—a state type group for grouping clustered and stand-alone DNS Servers.

DNS Server—an Enterprise Server which acts as a DNS naming service.

DNS Server Cluster—an Enterprise Server Cluster of DNS Servers.

Logical Mail Server—a state type group for grouping clustered and stand-alone Mail Servers.

Mail Server—an Enterprise Server which supports an internet mail protocol.

Mail Server Cluster—an Enterprise Server Cluster of Mail Servers.

Application Service Network Objects

Figure 14:
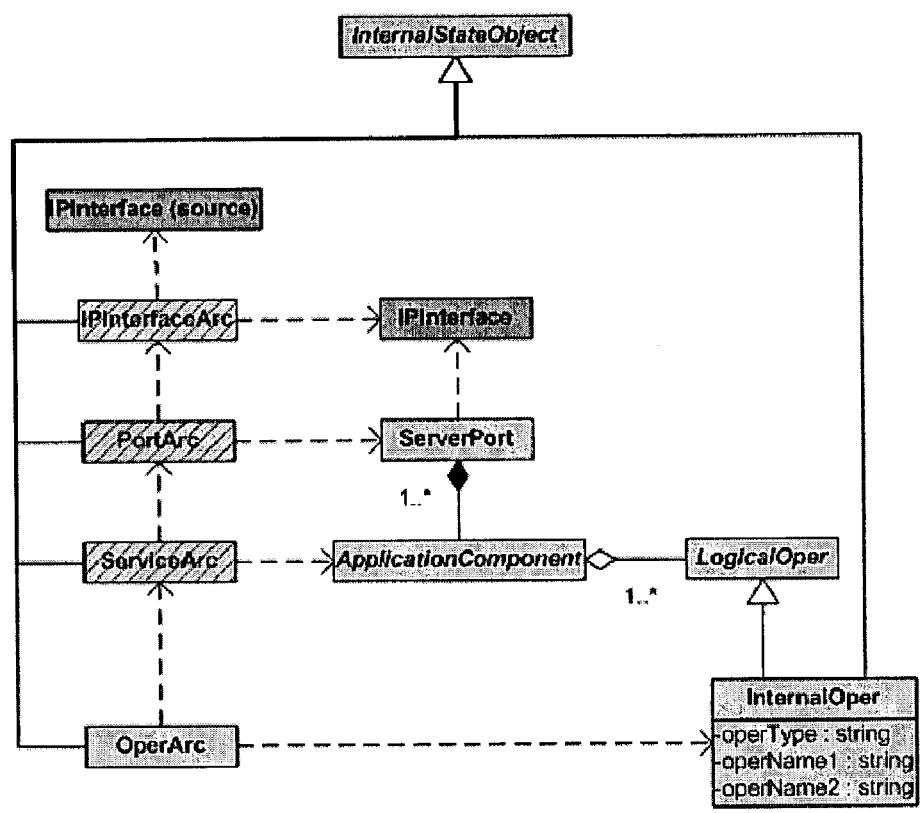
FIG. 14 is a block diagram for use in understanding certain Application Service Network Definitions used herein.

FIG. 14 is a block diagram for use in understanding certain Application Service Network Definitions used herein.

Arc—a conceptual path for message flow

OperArc—an Arc from a Source Node (IP Interface) to a particular Oper on a Destination Node (Application Component) and typically back again.

Source Node—an IP Interface which is the source of messages for a particular OperArc. Source Nodes are not necessarily under management (e.g. cases where they are Clients). On the other hand, some Source Nodes can also correspond to Application Services (see below).

Destination Node—an Application Component to which an OperArc message is sent. (No need for a separate Managed Object type here.)

Logical Oper—an abstract type encompassing all types of Opers. All logical opers are associated with a specific Application Component.

Logical Opers are "contained" by Application Components rather than "hosted" by them because one does not need to model the Application Component in order to model and monitor an Oper. One can intercept message traffic without having modeled the destination component explicitly.

Internal Oper—the internal representation of the entry point within the Application Component interface which an OperArc attempts to invoke. Used by the system's internal mechanisms for capturing component message traffic.

| | | |
|---|---|---|
| operType | string | SOAP or SERVERPAGE |
| operName1 | string | Identifier for the Oper, depends on protocol. E.g. for SOAP, operName1 is the HTTP header identifier. |
| operName2 | String | Identifier for the Oper, depends on protocol. E.g. for SOAP, operName2 is the payload identifier. |

ServiceArc—an Arc between the consumer IP Interface and provider Service

PortArc—an Arc between the consumer IP Interface and provider Port

IPInterfaceArc—an Arc between the consumer IP Interface and provider IP Interface Application Service Network—the set of Arcs, Source Nodes, and Destination Nodes within a Domain which define all Application communicational interactions.

Application Layer Objects

Figure 15:
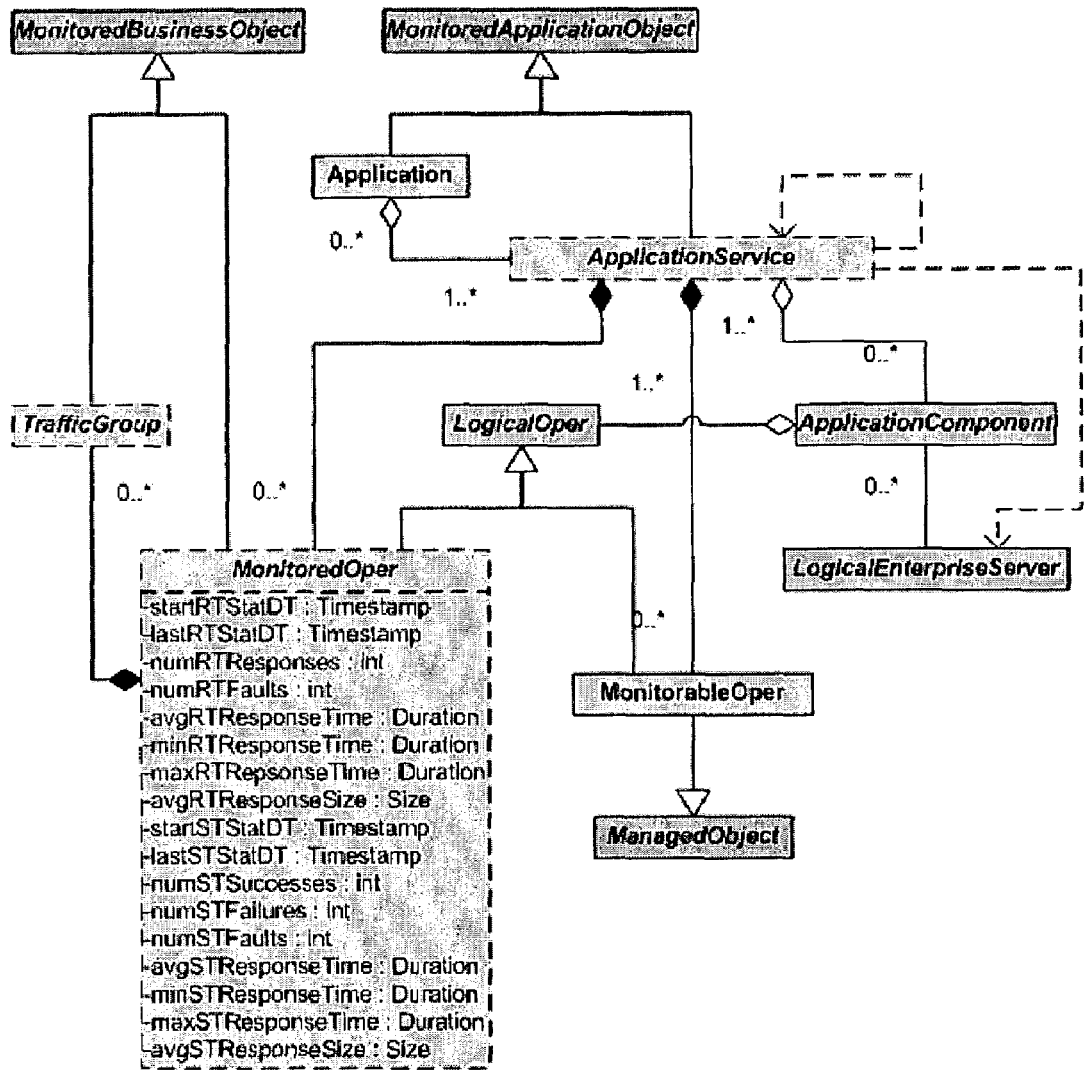
FIG. 15 is a block diagram illustrating certain Application layer entities, according to an embodiment of the invention.

FIG. 15 is a block diagram illustrating certain Application layer entities, according to an embodiment of the invention.

Application—a set of one or more Application Services which are presented to end users in a coherent manner, typically through some kind of user interface.

Application Service—a set of zero or more Application Components which collaborate to contribute a functionally coherent set of features to one or more Applications (or Business Services).

The Application Components in an Application Service can be heterogeneous in nature and can span application tiers. For example, a Servlet, a Web Service, and a database schema can coordinate to provide one set of coherent functionality. This case also demonstrates how Application Services can sometimes span more than one Host.

One use case where an Application Service contains exactly zero Application Components is called a "Logical Application Service". This case is useful to describe Application Services which are maintained by external organizations, such as third parties. The internal Application Component structure is not available, but the Opers are still available so the Logical Application Service can still be managed. Another use case where Application Services contain no components is when the user only models the Application and Business Layers, such as in a Line-of-Business-only deployment scenario.

Application Components can belong to more than one Application Service. Application Services cannot contain other Application Services, but rather can contain overlapping sets of Application Components.

Application Services are defined as abstract and customizable because, in general, they will need to be decorated with novel attributes during system customization to meet customer requirements. While many of these attributes will be application attributes, some of them can be business attributes as well. This is because business attributes are generally derived directly from either application layer objects or the traffic that passes through them. However, these business attributes are not made visible in the GUI while viewing the Application Service from the Application Layer perspective. They are only visible when using the Application Service from the Business Service perspective.

Application Service Interface—the programmatic entry point into an Application Service. Typically, this maps one-to-one with that specific Application Component Interface which is "public to", i.e. not encapsulated within but rather exposed externally from, the Application Service. [Cases where the Application Service Interface consists of multiple Application Component Interfaces are permissible but discouraged as a poor style of modeling.]

Application Service Address—ordered set of data which facilitates connection to and communication with an Application Service Interface. We stipulate that all application Service Addresses must directly contain or indirectly map to a single Virtual Host or IP Interface.

Monitorable Oper—a subset of the Internal Opers of the Application Components within an Application Service which are included within the Application Service Interface.

Monitorable Opers exist within our model as a mechanism for excluding Opers from the Application Service Interface which are not relevant externally to that Service, i.e. they are our method of enforcing abstraction. Typically, a user very familiar with the deep structure of an application will be the one to declare which Opers should become Monitorable Opers. Monitorable Opers are the only Opers which are able to be declared to be Monitored Opers.

Monitored Oper—a subset of the Monitored Opers within an Application Service Interface which the end-user has declared a desire to monitor. Such monitoring can focus on either application attributes or business attributes. Monitored Opers properly belong to the Application Layer because the traffic being monitored is undeniably application-level traffic, but the object also lives a double-life within the Business Layer since some of the payload being monitored is also interesting from a business perspective.

Accordingly, Monitored Oper derives from Monitored Business Object, since business status and other business attributes are associated with this object. The business attributes associated with a Monitored Oper should only visible from within the GUIs associated with the Business Layer. When managed from "within the Application Layer", the business attributes can simply be ignored.

Monitored Oper is declared as both abstract and customizable because, in general, users will want to add application and business attributes to a concrete Monitored Oper type during system customization. Typically, a user very familiar with the operations of a business (or how they want to use our product to manage a business) will be the one to declare which Opers should become Monitored Opers. Users wishing to monitor application-level message flow may wish to create Monitored Opers as well.

The built-in attributes of Monitored Oper focus upon measuring performance. They fall into two high-level categories: performance of Real Traffic (RT) messages, and performance of Synthetic Transaction (ST) messages.

| | | | |
|---|---|---|---|
| startRTStatDT | Timestamp | APP | The time the system started collecting Real Traffic metrics on this oper |
| lastRTStatDT | Timestamp | APP | The time the system last updated the Real Traffic metrics on this oper |
| numRTResponses | int | APP | Number of Real Traffic responses over this oper since startTime |
| numRTFaults | int | APP | Number of Real Traffic faults over this oper since startTime |
| avgRTResponseTime | Duration | APP | Average response time for successful Real Traffic oper invocations since startTime |
| minRTResponseTime | Duration | APP | Minimum response time for successful Real Traffic oper invocations since startTime |
| maxRTResponseTime | Duration | APP | Maximum response time for successful Real Traffic oper invocations since startTime |
| avgRTResponseSize | Size | APP | Average size of the response for successful Real Traffic oper invocations since startTime |
| startSTStatDT | Timestamp | APP | The time the system started collecting Synthetic Transaction metrics on this oper |
| lastSTStatDT | Timestamp | APP | The time the system last updated the Synthetic Transaction metrics on this oper |
| numSTSuccesses | int | APP | Number of successful Synthetic Transaction invocations of this oper since startTime |

-continued

| | | | |
|---|---|---|---|
| numSTFailures | int | APP | Number of failed Synthetic Transaction invocations of this oper since startTime. |
| numSTFaults | int | APP | Number of Synthetic Transaction invocations of this oper resulting in faults since startTime |
| avgSTResponseTime | Duration | APP | Average response time for successful Synthetic Transaction oper invocations since startTime |
| minSTResponseTime | Duration | APP | Minimum response time for successful Synthetic Transaction oper invocations since startTime |
| maxSTResponseTime | Duration | APP | Maximum response time for successful Synthetic Transaction oper invocations since startTime |
| avgSTResponseSize | Size | APP | Average size of the response for successful Synthetic Transaction oper invocations since startTime |

Traffic Group—a subset of message flow through a Monitored Oper which corresponds to a specified message filter. The filter can be defined on an entire Monitored Oper, or based on inspection of actual message payload.

For example, one might intercept the customer name within each message and attribute that message to a Traffic Group that represents a customer group, such as Gold customers or Platinum customers. Then, performance attributes can be collected on each Traffic Group to monitor whether or not each customer group is getting the quality of service they are paying for. Traffic Groups are declared to be abstract and customizable because it is expected that attributes will be added to them during customization time. Those attributes can be either application or business attributes, just as for all other customizable objects within the Application Layer.

Traffic Groups derive of Monitored Business Object, and live a double-life within the Business Layer similarly to how Monitored Opers do, for all the same reasons.

Business Layer Objects

Figure 16:
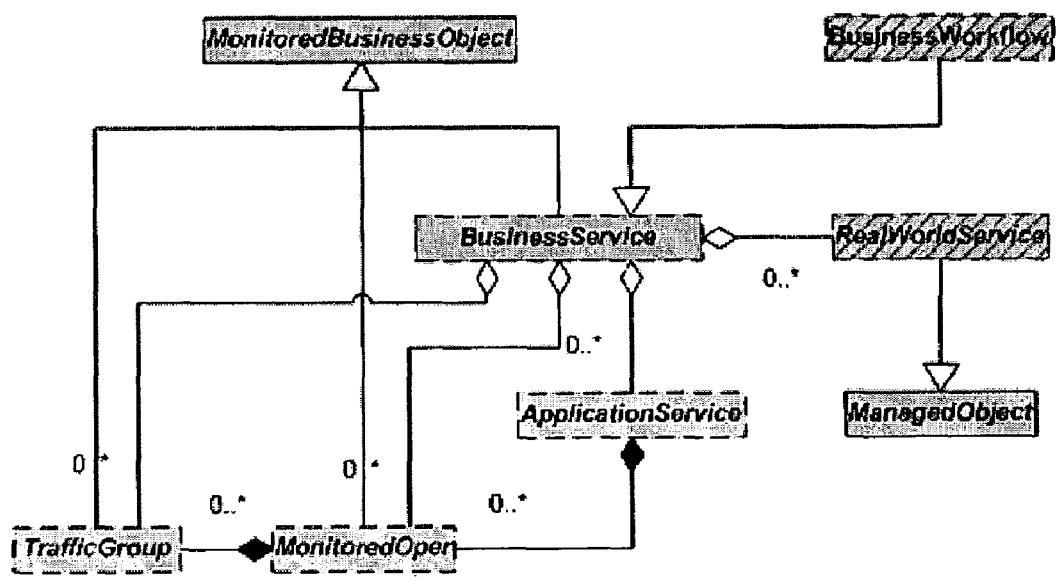
FIG. 16 is a block diagram illustrating certain Business layer entities according to an embodiment of the invention.

FIG. 16 is a block diagram illustrating certain Business layer entities according to an embodiment of the invention.

Business Service—a set of one or more Application Services and/or Real World Services which collaborate to provide a coherent set of functionality that is relevant to a line of business.

This set is minimally unordered, but might sometimes be ordered into a graph which indicates workflow between constituent services. The latter type of Business Service is called a Business Workflow. Flows through a business service are a mix of automated and manual real-world operations.

Business Services are declared to be abstract and customizable because it is expected that users will want to add business attributes into their particular concrete types. This is one of the primary places in the model where business attributes are recorded, either for display or monitoring purposes. Business attributes are most often derived of business data that is intercepted from real traffic messages.

Business attributes can also be associated with Monitored Opers and Traffic Groups. Proper attribution is a matter of choosing the appropriate scope of the attribute in question. If the attribute deals with concepts pertaining to the whole service, such as overall profitability, they should be associated with the Business Service. If they deal with concepts particular to a single oper, such as number of times a shopping cart was abandoned, they should be associated with the Monitored Oper. If they deal with concepts particular to a Traffic Group, such as number of Platinum Customers who had performance issues in the last week, they should be associated with the appropriate Traffic Group.

Real World Service—a manual set of operations that are important to a Business Service. For example, sending a package out on a truck, manufacturing an actual product, etc.

Business Service Oper—a Monitored Oper upon which business attributes have been defined. Monitored Opers are typically only called Business Service Opers within the GUI when performing management from a business perspective.

Business Traffic Group—a Traffic Group upon which business attributes have been defined. Traffic Groups are typically only called Business Traffic Groups within the GUI when performing management from a business perspective.

Future Objects

The objects depicted as shaded objects in the diagrams in this section will most likely be implemented in a future product release. They are but a small subset of the consistent extensions to the type model we have already proposed.

Figure 17:
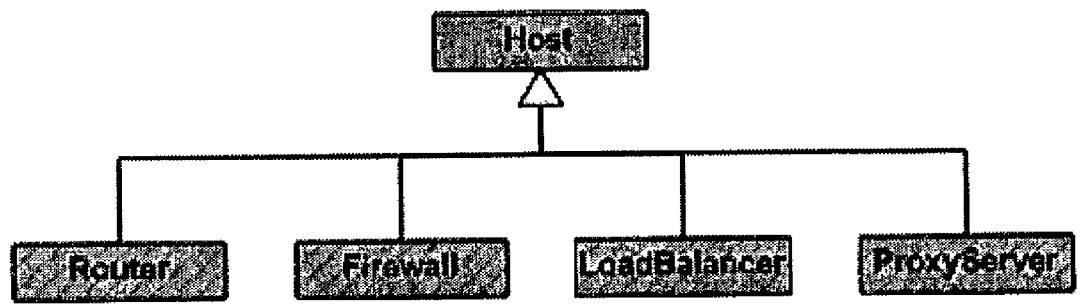
FIG. 17 is a block diagram illustrating certain Future Network Infrastructure Layer Objects, according to an embodiment of the invention.

FIG. 17 is a block diagram illustrating certain Future Network Infrastructure Layer Objects, according to an embodiment of the invention.

Figure 18:
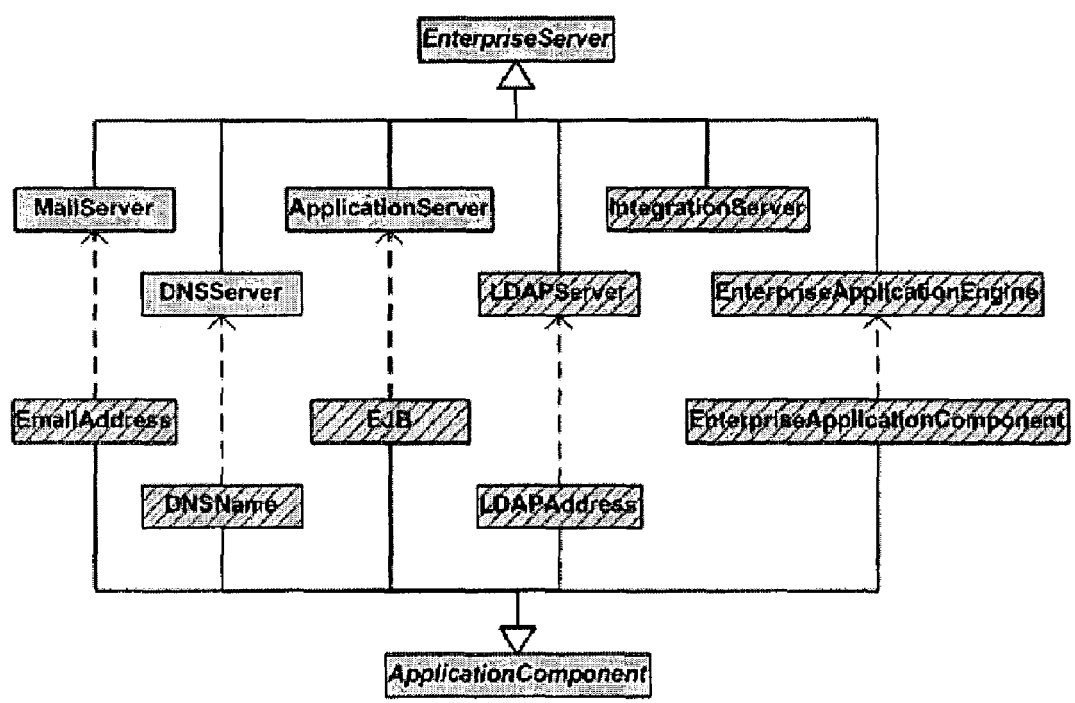
FIG. 18 is a block diagram illustrating certain Future Software Infrastructure Layer Objects, according to an embodiment of the invention.

FIG. 18 is a block diagram illustrating certain Future Software Infrastructure Layer Objects, according to an embodiment of the invention.

Design Patterns and Usage—Object and Attribute Visibility

The following diagram displays what the rules are for visibility of different attributes within the GUI applications.

FIG. 19 is a diagram illustrating attribute visibility by category, according to an embodiment of the invention.

When managing within the Infrastructure Layers, all of the attributes which are visible are infrastructure attributes. When managing within the Application Layer, application attributes become visible. When managing within the Business Layer, all categories of attributes are visible.

The only confusing place in the model is with regards to Application Layer objects, such as Application Services, Monitored Opers, and Traffic Groups. These typically have an associated mix of business and application attributes. But the business attributes should only be visible within the GUI when these objects are being managed from within the Business Layer. It is as if aspects of these objects only exist within the Business Layer, even though the objects' identities remain the same.

Oper Object Type Hierarchy

The next diagram shows all of the different types of Oper objects side-by-side, rather than within their respective layers.

Figure 20:
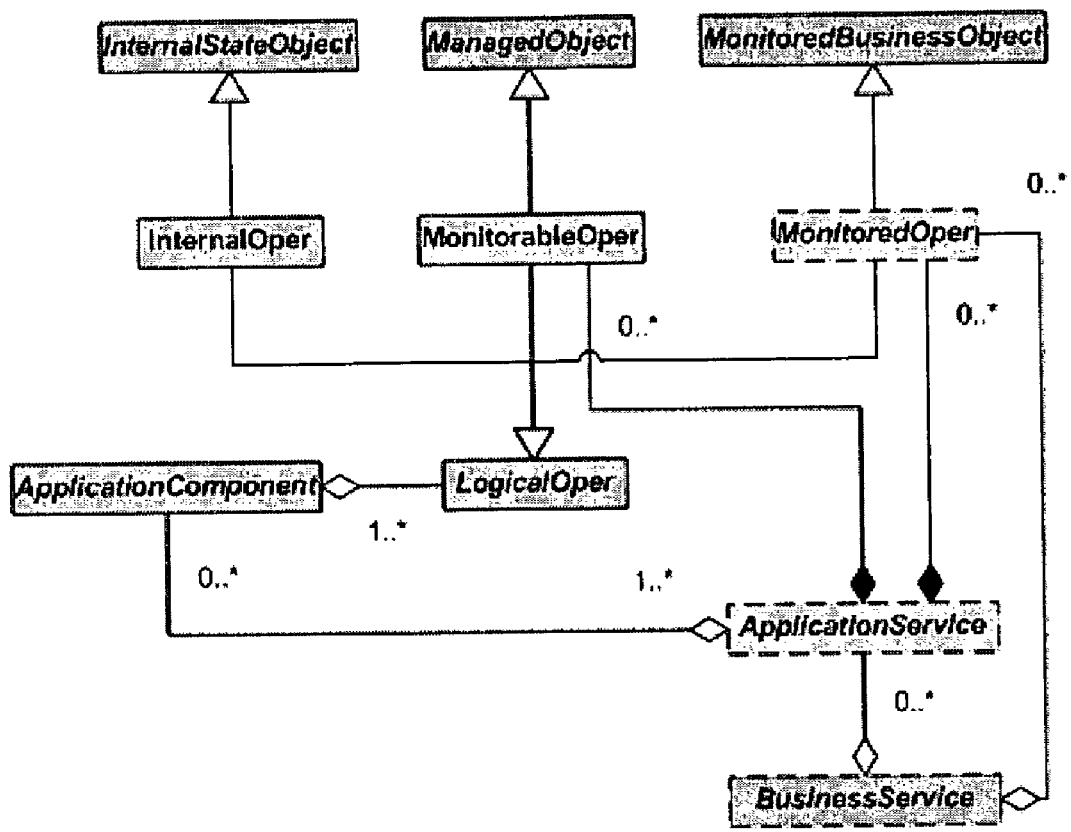
FIG. 20 is a block diagram that illustrates an Oper Object Type Hierarchy, according to an embodiment of the invention.

FIG. 20 is a block diagram that illustrates an Oper Object Type Hierarchy, according to an embodiment of the invention.

FIG. 20 illustrates the following:
1. Internal Opers are Internal State Objects, Monitorable Opers are Managed Objects (but not Monitored Managed Objects), and Monitored Opers are Monitored Business Objects (a subclass of Monitored Managed Object).
2. Monitorable Opers and Monitored Opers can only exist within an Application Service.
3. Monitored Opers have relationships not only within Application Services, but within Business Services which contain those Application Services as well.
4. All of these Oper types are different uses of the same underlying object with the same identity associated with the same Application Component. In fact, the system name for like Internal Opers, Monitorable Opers, and Monitored Opers must all be the same.

Oper Modeling

There are two levels of the filtering of Opers:
1. Application Modeling—an expert in the application structure (such as the Patrick persona) determines which Logical Opers are relevant from an application workflow perspective. The method of abstraction is defining which Opers should be modeled as Monitorable Opers within the Application Service. Only the relevant subset of Opers become Monitorable Opers.
2. Business Modeling—an expert in the business service (such as the David or Matt personas) determines which Logical Opers are interesting from a business service management perspective. This task is made easier in that the choices are already limited to those which have been declared to be Monitorable Opers. The method of abstraction is defining which Monitorable Opers should be modeled as Monitored Opers within either a Business Service or an Application Service. Those Monitored Opers defined within a Business Service are called Business Service Opers.

Figure 21:
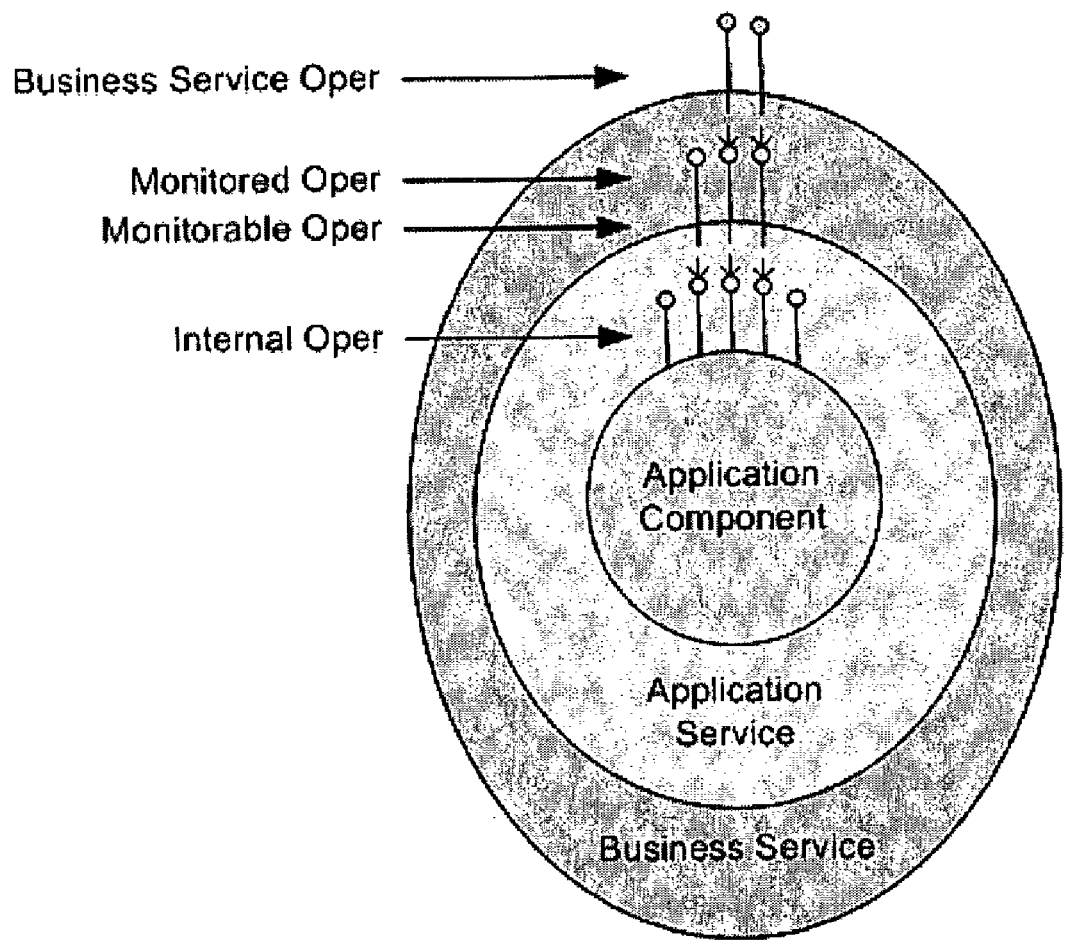
FIG. 21 is a diagram illustrating certain concepts relating to oper modeling, according to an embodiment of the invention.

FIG. 21 is a diagram illustrating certain concepts relating to oper modeling, according to an embodiment of the invention.

Associations Between Application Model Types

This is the list of direct associations required within the Application Model. Object types that are in italics are abstract. Associations between mappable object types are in bold.

TABLE 5

Direct Managed Object Association Chart

| Source Type | Association | Destination Type |
|---|---|---|
| Host | Hosts | IP Interface |
| Virtual Host | Contains | IP Interface |
| Server Port | Depends on | IP Interface |
| Host | Hosts | Enterprise Server |
| Enterprise Server | Hosts | Server Port |
| Application Component | Depends on | Server Port |
| Enterprise Server Cluster | Contains | Enterprise Server |
| Enterprise Server Cluster | Contains | Host |
| Enterprise Server Cluster | Contains | Enterprise Server |
| Enterprise Server Cluster | Depends on | Virtual Host |
| Application Component Cluster | Contains | Application Component |
| Application Component Cluster | Depends on | Enterprise Server Cluster |
| Application Component | Contains | Logical Oper |
| Oper Arc | Depends on | IP Interface |
| Oper Arc | Depends on | Internal Oper |
| Application Service | Contains | Application Component |
| Application Service | Hosts | Monitorable Oper |
| Application Service | Hosts | Monitored Oper |
| Application Service | Depends on | Application Service |
| Application Service | Depends on | Logical Enterprise Server |
| Application | Contains | Application Service |
| Monitored Oper | Hosts | Traffic Group |
| Business Service | Contains | Application Service |
| Business Service | Contains | Monitored Oper |
| Business Service | Contains | Traffic Group |

Many other associations exist, but must be derived by traversal of these relationships as well as those within a particular layer of the model. For example, to find out which Hosts an Application Service depends upon, one must traverse from the Application Service to their supporting Enterprise Servers, to their supporting Hosts.

The "Enterprise Server Cluster contains Host" association above is provided simply to facilitate the navigability of the model between mappable objects. The GUI doesn't generally desire to show the constituent Enterprise Servers within a cluster on a map.

Other Object Types—User and Department Objects

Figure 22:
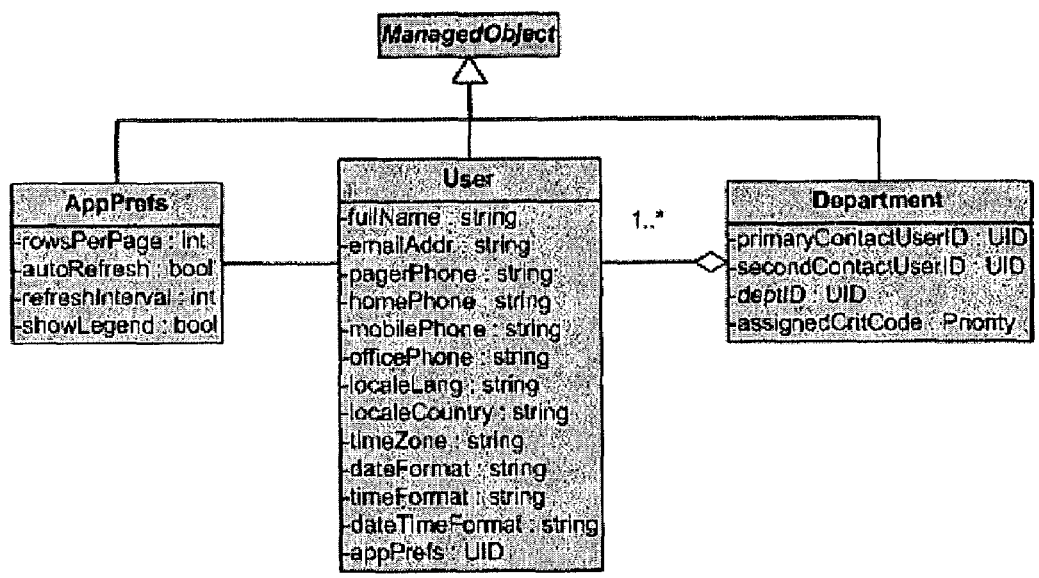
FIG. 22 is a block diagram of certain User and Department Objects, according to an embodiment of the invention.

FIG. 22 is a block diagram of certain User and Department Objects, according to an embodiment of the invention.

User—managed object that represents an end-user of our system. Contains personal contact information and system-defined user preferences. The user's username should be stored as the displayName

| | | | |
|---|---|---|---|
| fullName | string | ADMIN | The full name of the user. |
| emailAddr | string | ADMIN | The user's email address. |
| pagerPhone | string | ADMIN | The user's pager phone number. |
| homePhone | string | ADMIN | The user's home phone number. |
| mobilePhone | string | ADMIN | The user's mobile phone number. |
| officePhone | string | ADMIN | The user's office phone number. |
| localeLang | string | ADMIN | The Java representation of the language within the user's preferred locale. |
| localeCountry | string | ADMIN | The Java representation of the country within the user's preferred locale. |
| dateFormat | string | ADMIN | The Java representation of the user's preferred date format. |
| timeFormat | string | ADMIN | The Java representation of the user's preferred time format. |
| dateTimeFormat | string | ADMIN | The Java representation of the user's preferred date and time format. |
| appPrefs | UID | ADMIN | A reference to the user's application-specific preferences. |

Application Preferences (AppPrefs)—a managed object used to store application-specific user preferences. Different applications might define different object types here with distinct attributes. This version is for our out-of-the-box applications.

| | | | |
|---|---|---|---|
| rowsPerPage | int | ADMIN | Maximum number of rows that should be shown in a table per page. |
| autoRefresh | bool | ADMIN | Whether or not to refresh the pages automatically. |
| refreshRate | int | ADMIN | The frequency (in seconds) with which to refresh the pages if autoRefresh is set to "true" |
| showLegend | bool | ADMIN | Whether or not to show the map/tree legends. |

Department—corresponds to a department, line of business, etc. which is responsible for the operations of a Business Service. Departments can contain other Departments. All Managed Objects have an association to one and only one Department.

| | | | |
|---|---|---|---|
| primaryContactUserID | UID | ADMIN | The department's primary contact person. |
| secondContactUserID | UID | ADMIN | The department's secondary contact person. |
| DeptID | UID | ADMIN | The ID of the department that contains this department, or NULL if this department is top-most. |
| assignedCritCode | Priority | APP, ADVANCED | Direct indication of the relative business importance of the Department. This value will be used to default the assignedCritCode for an Application or Business Service if theirs is UNKNOWN. |

Event Type System—Core Event and Alert Types

This section describes the types which are core to the Event Type system.

Figure 23:
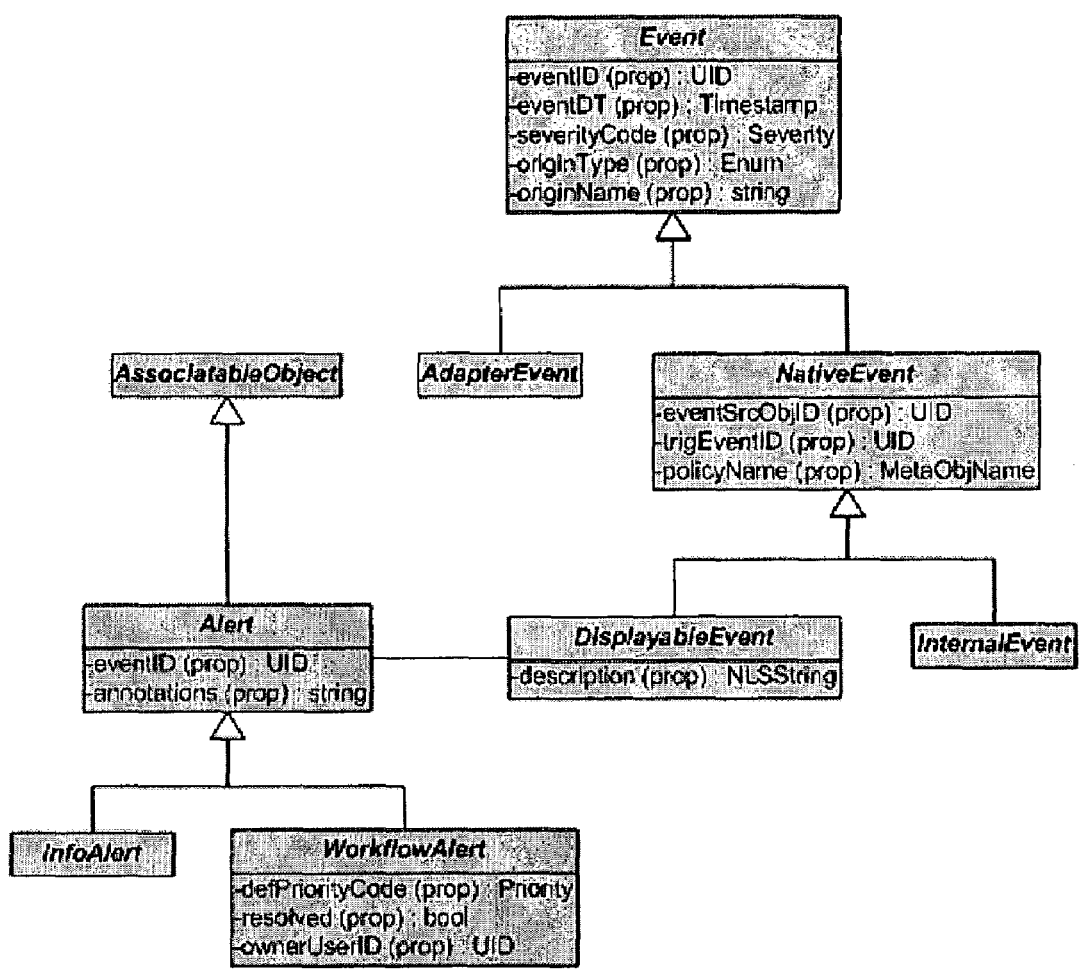
FIG. 23 is a block diagram illustrating Core Event and Alert Types, according to an embodiment of the invention.

FIG. 23 is a block diagram illustrating Core Event and Alert Types, according to an embodiment of the invention.

Event—abstract base class for all events

| | | |
|---|---|---|
| eventID | UID | Unique identifier for this event. Universally unique, so Adapters can generate their own IDs for Adapter Events. |
| eventDT | Timestamp | Time the event was created. Not necessarily the exact time the phenomena which triggered the event occurred. |
| severityCode | Severity | The subjective impact of the event. See the section on Severity values above. |
| originType | Enum | Category of origin. Enumeration of values ADAPTER - event came from an adapter PROBE - event was the result of running a probe INTERCEPTOR - event was the result of intercepted message traffic POLICY - event was emitted by a policy USER - an end-user's actions initiated the event SYSTEM - (reserved) |
| originName | string | Specific name of origin. E.g. for the OpenNMS Adapter, this would be "OpenNMS" with originType of ADAPTER. Must be the name of the triggering policy for derived events, and so on. Naming convention is to capitalize the first letter of each word within the name, much like for Java class names. |

Native Event—abstract base class for events which are native within our system.

| | | |
|---|---|---|
| eventSrcObjID | UID | ID of state object to which this Event correlates. This value should never be NULL for a NativeEvent. |
| TrigEventID | UID | ID of triggering event. NULL for observed events. |
| policyName | MetaObjName | Name of the originating policy which created this event. NULL for observed events. [Implementation note: the actual property is the policyID, but this ID is never surfaced within the model. policyName is actually a pseudo-attribute.] |

One can always determine whether or not an Event is observed or derived by inspecting whether or not the trigEventID or policyName are NULL or defined.

Internal Event—abstract base class for events used solely within the platform. These events are never surfaced to the GUI.

Displayable Event—abstract base class for all event types which are meant to be displayed within our applications' GUI. Displayable Events must always be associated with an Alert. Whenever a Displayable Event is injected into the system, an Alert is automatically created which corresponds to it.

| | | |
|---|---|---|
| Description | NLSString | Arbitrary event message, intended for display in the GUI. Provides end user with details of event. |

The description of an event is the localized string which describes the event in detail. The idea here is that reading the description of a particular event instance should tell you almost everything you want to know about it at a high level. Compare the description of an event to the subject line of a bug in a bug database. The goal is to be concise but descriptive. Inclusion of supporting details taken from the event attributes is encouraged. To this end, the platform supports the inclusion of substitution parameters into the skeletal localized representation of the description.

The event description is NOT intended for programmatic use. Always use event attributes to obtain data for programmatic consumption.

Alert—a mutable Associatable Object associated with a particular Event, which is intended to be visible within our Application's GUI

| | | |
|---|---|---|
| EventID | UID | ID of the DisplayableEvent which corresponds to this Alert |
| annotations | string | Displayable buffer containing entries for multiple annotations, each of which is formatted to include the name of the user who placed the annotation and also a timestamp. |

Alerts are always subtyped into concrete types which correspond to concrete Displayable Event types. For example, InfrStatusChangeEvent (the Event type) corresponds to InfrStatusChangeAlert (the Alert type). We will adhere to the naming convention which says that for each Displayable Event name "xxxEvent", the Alert will be named "xxxAlert".

Alert subtyping is useful because queries can be formulated on particular Alert subtypes. For example, "return me all alerts of type InfrStatusChangeAlert". Queries for Alert types always return all Alert attributes in addition to all of the attributes for the corresponding Events. Or, alternately, if it is only the Event data which you are interested in, you can always query upon the Event type directly, and this will only return the attributes on the Event, not the Alert.

Alerts are the only entities in the system that can be correlated. Events cannot. This is acceptable, since correlation must be displayed to the GUI, and only Alerts can be displayed to the GUI.

Info Alert—an alert type group of Alerts which don't support any alert workflow.

Workflow Alert—an alert type group of Alerts which support alert workflow.

| defPriorityCode | Priority | The default priority for this alert, generated based on the Criticality of the event's source managed object. See section on Priority values above. |
| --- | --- | --- |
| Resolved | bool | Whether or not this alert has been resolved, i.e. requires no more attention. Resolved alerts are often filtered out from the GUI. |
| ownerUserID | UID | Identifier of user assigned as the owner of this alert, or NULL if there is none. |

Alert Associations

Figure 24:
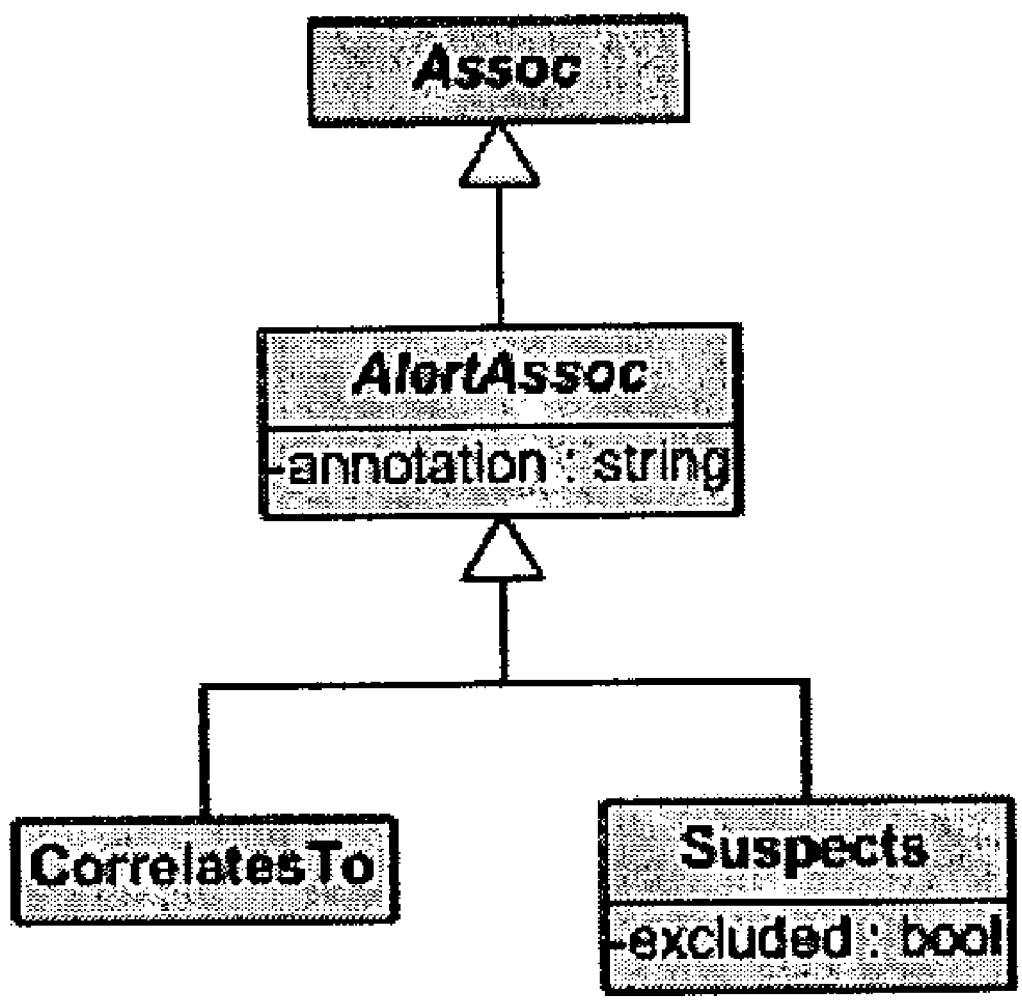
FIG. 24 is a block diagram illustrating Alert Associations, according to an embodiment of the invention.

FIG. 24 is a block diagram illustrating Alert Associations, according to an embodiment of the invention.

Alert Assoc—a logical grouping of associations between alerts. There is no such thing as an Association Type Group in our current platform, nor is there any requirement for it.

| Annotation | string | Displayable buffer containing user's comments on the association. |
| --- | --- | --- |

Correlates To—an association which expresses correlation between Alerts. The association runs from the alert which is caused by the destination alert.

Suspects—an association which establishes the destination alert as a member of the suspect list for the source alert.

| excluded | bool | "True" if this association has been excluded from the suspect list. |
| --- | --- | --- |

The reason we have the excluded attribute on the Suspects association is to enable us to temporarily demark that this suspect is excluded from the list without actually removing the association from the list. That way, the exclusion operation is more easily reversible.

Alert Type Categories

Figure 25:
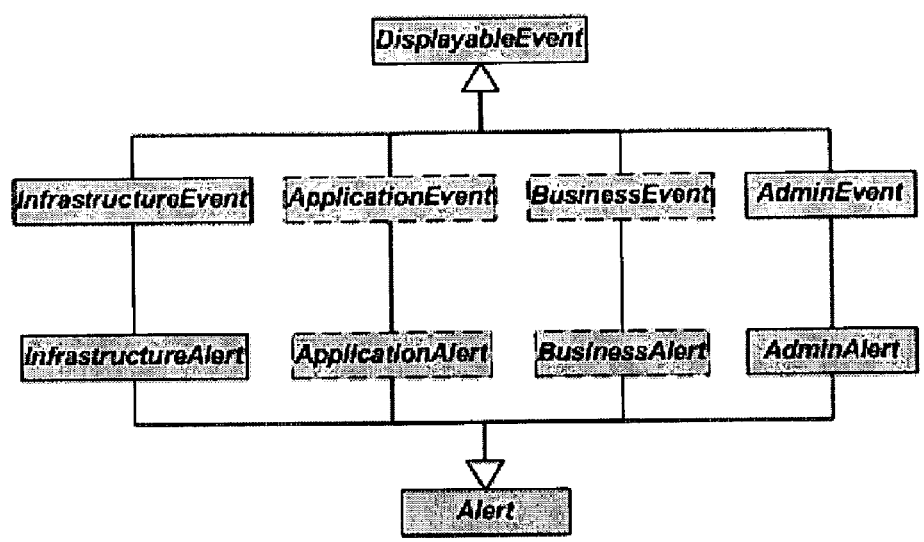
FIG. 25 is a block diagram illustrating Alert Type Category Groups, according to an embodiment of the invention.

FIG. 25 is a block diagram illustrating Alert Type Category Groups, according to an embodiment of the invention.

All Alerts within our system are categorized according to one of four categories: infrastructure, application, business, and admin. These categories are semantically identical to the "category" qualifier on the Event type meta-object. Each category is represented in the system by an alert type group.

All of these Alert Type groups are displayable. Related internal events which might otherwise fall into the category are not part of the type groups as they are not displayable, e.g. Business Transaction events are not considered to be in the BusinessEvent type group even though they are events that are business-related.

Here are the members of each top-level alert type group. Some of these are alert type groups themselves.

TABLE 6

| Alert Type Categories | |
| --- | --- |
| Infrastructure Alerts | InfrSTThresholdAlert |
| | InfrStatusChangeAlert |
| | InfrSLOViolationAlert |
| Application Alerts | AppSTThresholdAlert |
| | AppStatusChangeAlert |
| | AppSLOViolationAlert |
| Business Alerts | BizThresholdAlert |
| | BizStatusChangeAlert |
| | BizActivityAlert |
| | BizExceptionAlert |
| | BizSLOViolationAlert |
| Admin Alerts | ObjectLifecycleAlert |
| | AdapterStateChangeAlert |
| | EMSStateChangeAlert |
| | PolicyExceptionAlert |
| | ModelInconsistencyAlert |
| | ExtractorSchemaChangeAlert |

Business Events

Figure 26:
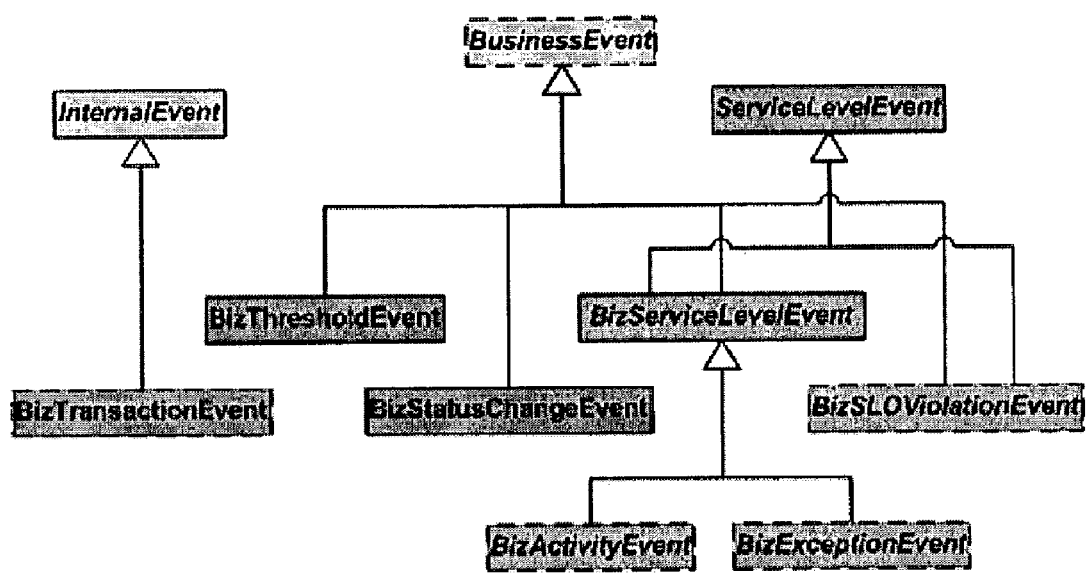
FIG. 26 is a block diagram illustrating Business Events, according to an embodiment of the invention.

FIG. 26 is a block diagram illustrating Business Events, according to an embodiment of the invention.

Business Event—an Event which reports on matters which are relevant from a purely business perspective. Business Event itself is declared to be customizable to allow for the possibility of novel injected business events to be defined.

Business Transaction Event—represents a business-level transaction. This is the type of event that Transaction Extractors should inject. These are internal events. For the most part, they are too fine-grained to be of direct interest to the GUI. However, policies can be written to translate these into displayable BusinessEvents, such as BizThresholdEvent.

Business Threshold Event—triggered when a business threshold is crossed (in either direction) when detected through some mechanism other than Service Level measurement.

Business Status Change Event—triggered when there is a change in business status for an object. The severity of the event should be the new status of the object.

Business Activity Event—triggered when a Business Activity crosses a specified threshold. See Service Level Events below.

Business Exception Event—triggered when a Business Exception is detected or cleared. See Service Level Events below.

Business SLO Violation—triggered when an SLO is violated on a business layer object. See Service Level Events below.

Application Events

Figure 27:
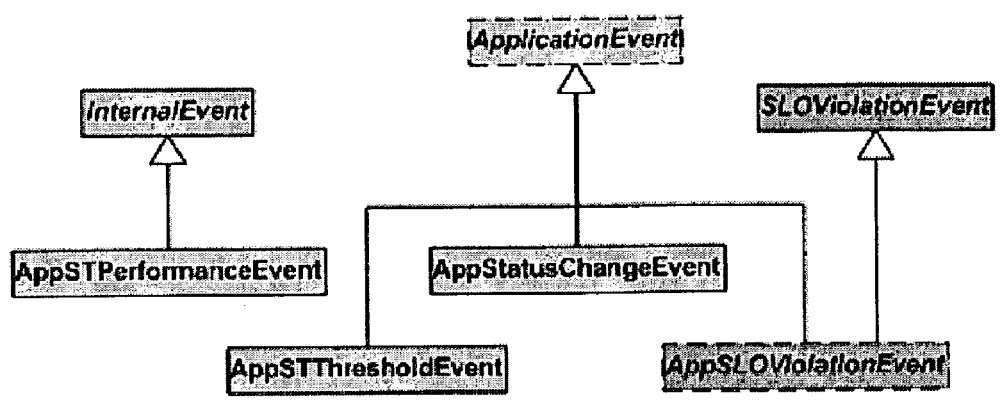
FIG. 27 is a block diagram illustrating Application Events, according to an embodiment of the invention.

FIG. 27 is a block diagram illustrating Application Events, according to an embodiment of the invention.

Application Event—an Event which reports on matters which are relevant from an application perspective. Application Event itself is declared to be customizable to allow for the possibility of novel injected application events to be defined.

Application ST Performance Event—an event which communicates an application performance metric. These events are fine-grained snapshots in time, and are only used for internal record-keeping. They are internal events. They can be monitored, however, to try to detect AppSTThresholdEvents.

Application ST Threshold Event—triggered when an application performance threshold is crossed (in either direction) when detected through some mechanism other than Service Level measurement.

Application Status Change Event—triggered when there is a change in application status for an object. The severity of the event should be the new status of the object.

Application SLO Violation—triggered when an SLO is violated on an application layer object. See Service Level Events below.

Infrastructure Events

Figure 28:
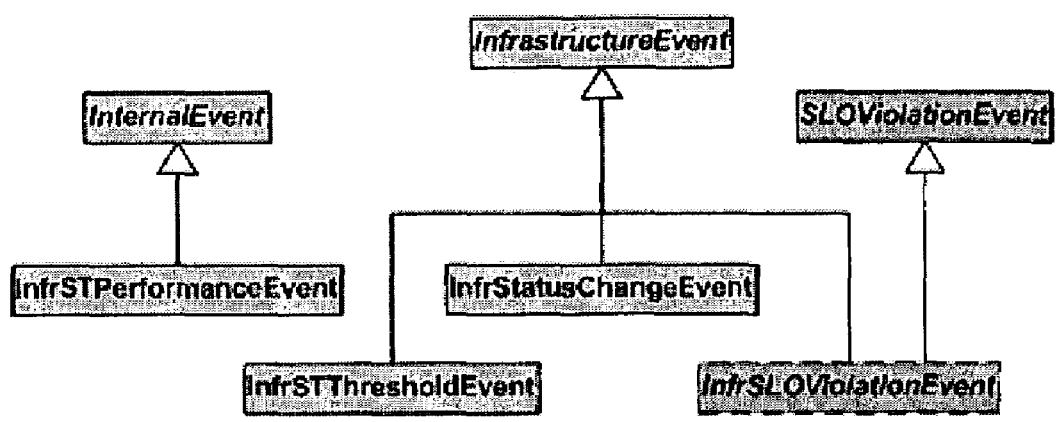
FIG. 28 is a block diagram illustrating Infrastructure Events, according to an embodiment of the invention.

FIG. 28 is a block diagram illustrating Infrastructure Events, according to an embodiment of the invention.

Infrastructure Event—an Event which reports on matters which are relevant from an infrastructure perspective.

Infrastructure ST Performance Event—an event which communicates an infrastructure performance metric. These events are fine-grained snapshots in time, and are only used for internal record-keeping. They are internal events. They can be monitored, however, to try to detect InfrSTThresholdEvents.

Infrastructure ST Threshold Event—triggered when an infrastructure performance threshold is crossed (in either direction) when detected through some mechanism other than Service Level measurement.

Infrastructure Status Change Event—triggered when there is a change in infrastructure status for an object. The severity of the event should be the new status of the object.

Infrastructure SLO Violation—triggered when an SLO is violated on an infrastructure layer object. See Service Level Events below.

Service Level Events

Figure 29:
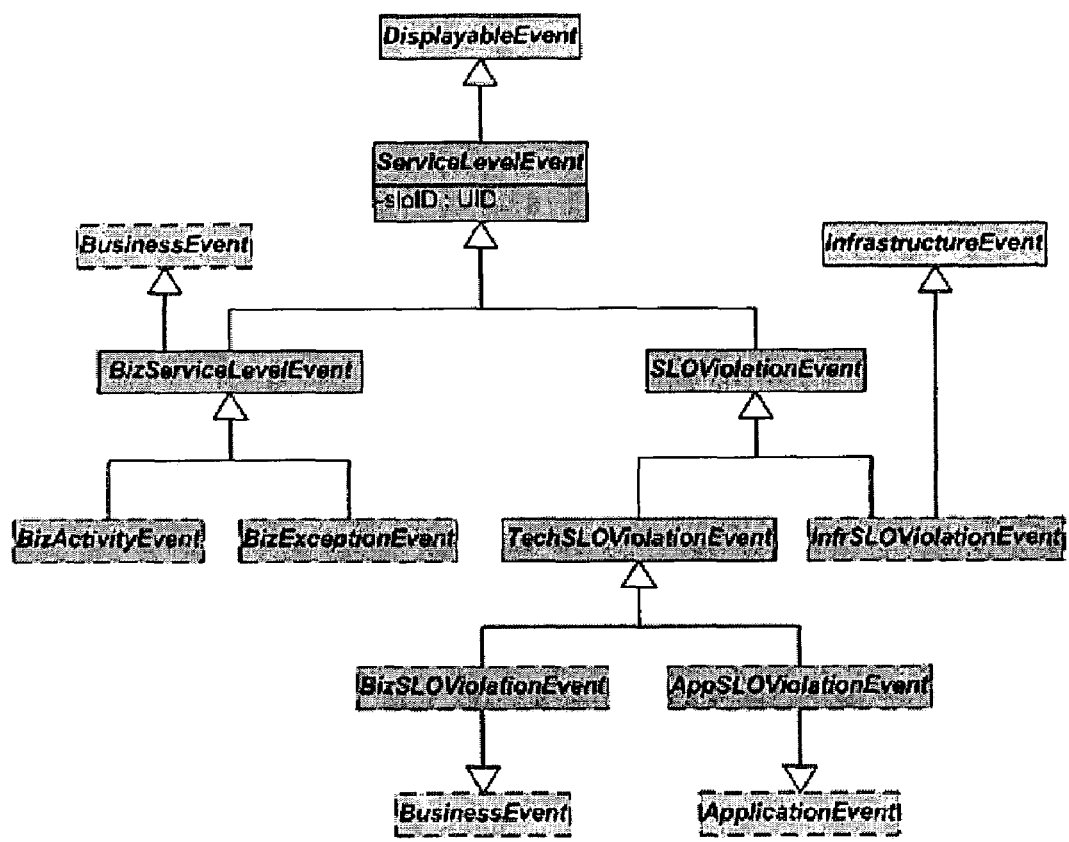
FIG. 29 is a block diagram illustrating Service Level Events, according to an embodiment of the invention.

FIG. 29 is a block diagram illustrating Service Level Events, according to an embodiment of the invention.

Service Level Event—an event fired as a result of the Service Level Monitoring mechanism.

There are three fundamental types of service level events: SLO Violations, Business Activity Events, and Business Exceptions. All three are detected using the same mechanisms. All three events use identical strategies for reporting their results.

| | | |
|---|---|---|
| sloID | UID | Identifier for the Service Level Objective (SLO) object which contains the metadata describing the Service Level that was triggered. |

All leaf subtypes of Service Level event must be customized relative to the details of the corresponding SLO. Each event carries with it a value for every indicator in the SLO, whether or not that indicator was responsible for firing the event or not. When the GUI goes to display the event, the actual indicator values are displayed in the context of the indicator expressions that the SLO defines.

SLO Violation Event—signals a change in SLO status. The new SLO status should be reported in the severity attribute. There are three subtypes, corresponding to the three categories of SLOs: BizSLOViolationEvent, AppSLOViolationEvent, and InfrSLOViolationEvent.

Business Service Level Event—an event type group to group all business-related Service Level Events. This does not include Business SLO Violations, which are technical in nature.

Business Activity Event—an event signaling business activity, as detected by the Service Level Monitoring mechanism.

Business Exception Event—an event signaling an exceptional business situation, as detected by the Service Level Monitoring mechanism.

Managed Object Events

Figure 30:
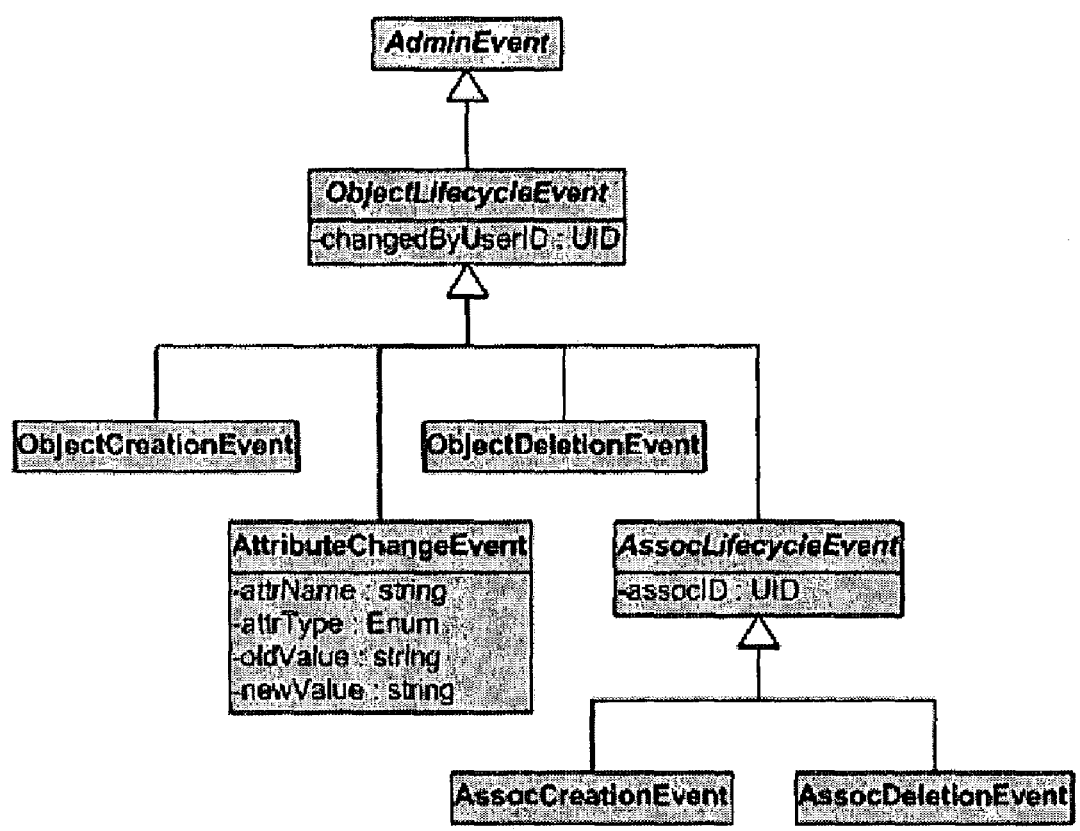
FIG. 30 is a block diagram illustrating Managed Object Events, according to an embodiment of the invention.

FIG. 30 is a block diagram illustrating Managed Object Events, according to an embodiment of the invention.

Object Lifecycle Event—abstract base class for events which signify transitions in the managed object or association lifecycle.

| | | |
|---|---|---|
| changedByUserID | UID | ID of User object representing the operator making the change. NULL if change is initiated by a Policy. |

The severity for all Object Lifecycle Events should be set to INFO.

Object Creation Event—fired when a new managed object instance is created.

Object Deletion Event—fired when a managed object instance is deleted.

Attribute Change Event—fired when an active attribute's value is changed. One event is fired for each attribute which is changed, i.e. if two active attributes on one object are changed, two events are fired.

| | | |
|---|---|---|
| attrName | string | Name of the attribute that changed |
| attrType | Enum | Data type of the attribute that changed |
| oldValue | String | Original value of the attribute, before the change. Value is expressed as a string, and should be cast by the client using attrType, if desired. |
| newValue | String | New value of the attribute, expressed as a string. |

Association Lifecycle Event—marks the creation or deletion of an Association

| | | |
|---|---|---|
| assocID | UID | ID of the Association which was created or deleted. |

Association Creation Event—fired when an association is created.

Association Deletion Event—fired when an association is deleted.

Admin Events

Figure 31:
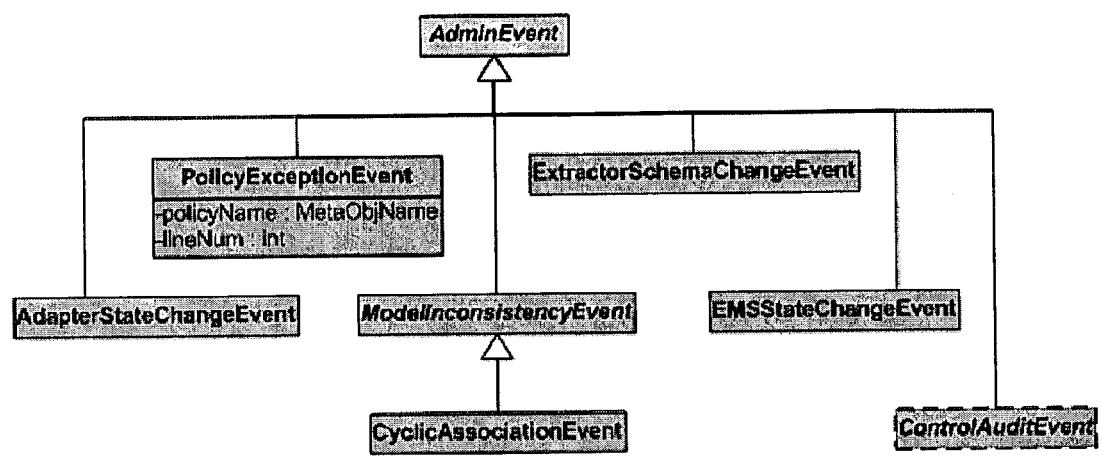
FIG. 31 is a block diagram illustrating Admin Events, according to an embodiment of the invention.

FIG. 31 is a block diagram illustrating Admin Events, according to an embodiment of the invention.

Policy Exception Event—notifies users when an exception occurs while a policy is executing

| | | |
|---|---|---|
| policyName | MetaObjName | The name of the policy which threw the exception. |
| lineNum | int | The line number within the policy where the exception occurred. |

Model Inconsistency Event—notifies users when the system detects when the user's data model is inconsistent. There will be many concrete subtypes of this event.

Extractor Schema Change Event—notifies users when a Transaction Extractor detects that the schema it expected differs from what it should be. Severity is always CRITICAL.

Adapter State Change Event—notifies users when an Adapter has had a change in operational state. CRITICAL means that the Adapter is down.

EMS State Change Event—notifies users when an Adapter has detected that its corresponding Enterprise Management System has had a change in operational state. CRITICAL means that the EMS is down.

Control Audit Event—an abstract customizable event type which represents an audit log entry for every time our system initiates a control operation.

Informational vs. Workflow Alerts

The following table describes with alert types should be InfoAlerts, and which should be WorkflowAlerts. If an event type is not listed directly in this table, look for an event type group to which it belongs.

TABLE 7

Informational vs. Workflow Alerts

| Event Type Name | Info or Workflow |
|---|---|
| BizThresholdAlert | Workflow |
| BizStatusChangeAlert | Workflow |
| ServiceLevelAlert | Workflow |
| AppSTThresholdAlert | Workflow |
| AppStatusChangeAlert | Workflow |
| InfrStatusChangeAlert | Workflow |
| InfrSTThresholdAlert | Workflow |
| ObectLifecycleAlert | Info |
| AdapterStateChangeAlert | Workflow |
| PolicyExceptionAlert | Workflow |
| ModelInconsistencyAlert | Workflow |
| ExtractorSchemaChangeAlert | Workflow |
| EMSStateChangeAlert | Workflow |

Traffic Events

Figure 32:
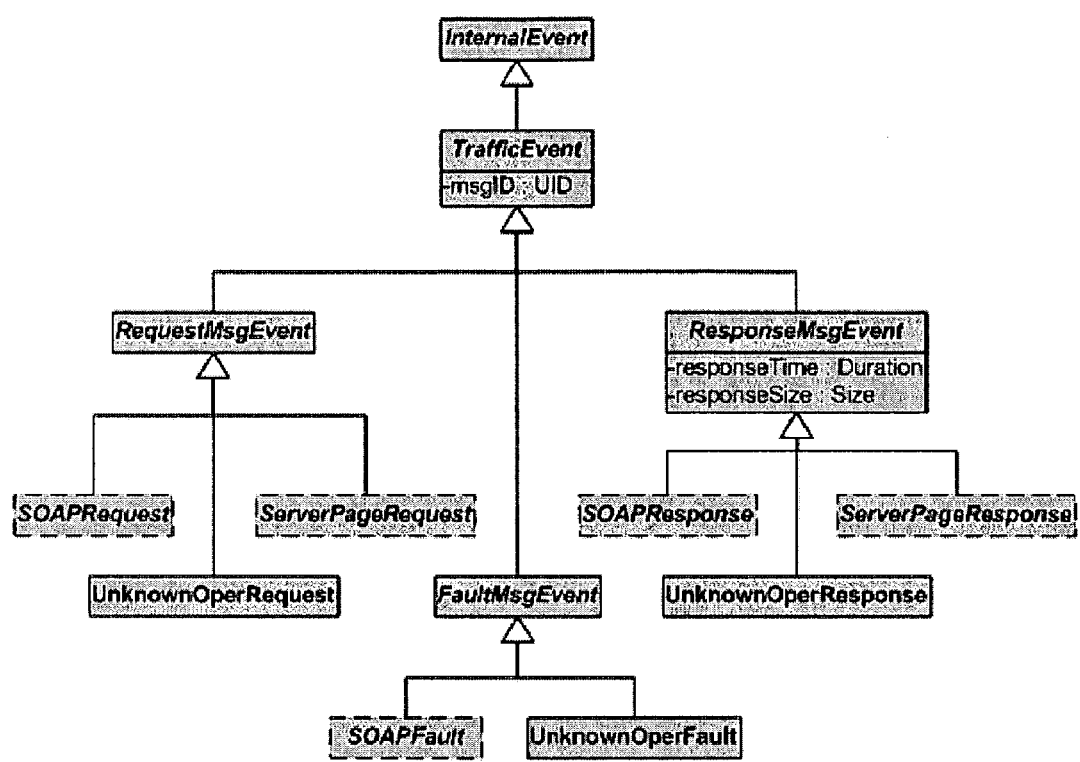
FIG. 32 is a block diagram illustrating Traffic Events, according to an embodiment of the invention.

FIG. 32 is a block diagram illustrating Traffic Events, according to an embodiment of the invention.

Traffic Events—events which represent real message traffic that was intercepted

| msgID | UID | ID which refers to the raw message payload of the intercepted message |
|---|---|---|

There is a novel event type generated for the each of the intercepted messages (request, response, and fault) to and from every Internal Oper. This leads to a large proliferation of event types. So unlike the UML in most sections, the UML above only describes the patterns which are employed to generate new Event types, rather than describing the concrete event types themselves. You will notice that many of the leaf classes are abstract and customizable; the new event types for each Internal Oper take the place of these. Customization in this case is performed automatically as a side effect of the Internal Oper discovery mechanism.

These novel event types are always created within the "DISCOVERY" namespace when first discovered. If users then want to rename the event types, they can do so explicitly. When renaming, users are required to rename into a different namespace.

Currently, our system intercepts SOAP, HTTP, HTTPS, and Server Page (JSP or ASP) traffic only. In the future, we might want to intercept other protocols, potentially including JDBC, MQSeries, JMS, and CORBA. New protocols would enter into this type hierarchy similarly to the ones you see above.

Request Message Event—event type group representing request messages. Response Message Event—event type group representing responses to requests. These also carry performance metrics for the round-trip of the Internal Oper invocation.

| responseTime | ulong | Time from the beginning of the request to the end of the response |
| responseSize | uint | Size of the raw response message |

Fault Message Event—event type group representing message faults.

There are also three "Unknown" subclasses defined, one for requests, one for responses, and one for faults. When the system encounters message traffic for which no Message Event types are already defined, it records the message as the appropriate "Unknown" Message Event type. Later, XDiscoverer comes around and attempts to create a new event type for these messages. Later messages which are intercepted will then be eventified into these newly created types.

Hardware Overview

Figure 33:
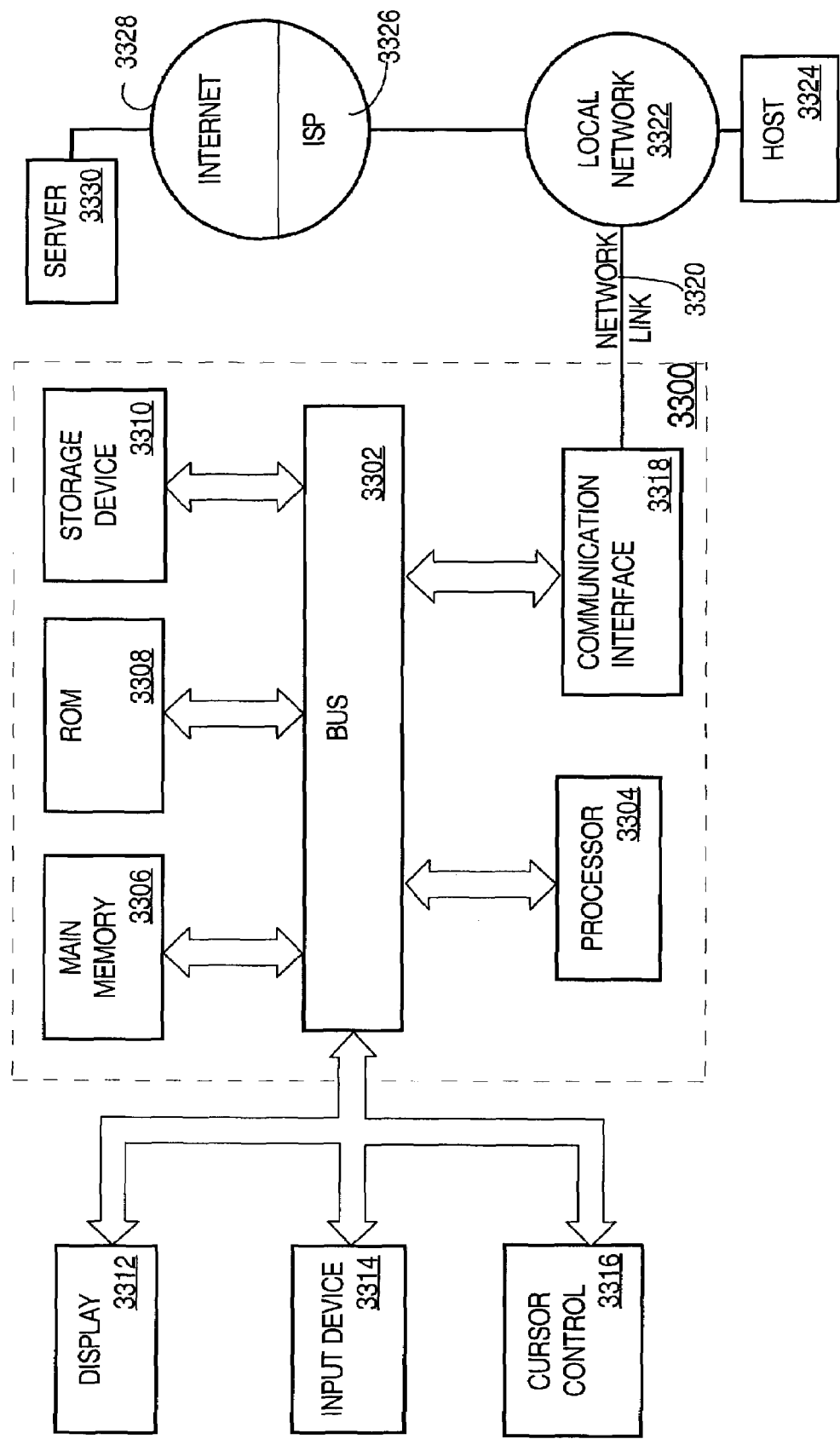
FIG. 33 is a block diagram of a computer system on which embodiments of the invention may be implemented.

FIG. 33 is a block diagram that illustrates a computer system 3300 upon which an embodiment of the invention may be implemented. Computer system 3300 includes a bus 3302 or other communication mechanism for communicating information, and a processor 3304 coupled with bus 3302 for processing information. Computer system 3300 also includes a main memory 3306, such as a random access memory (RAM) or other dynamic storage device, coupled to bus 3302 for storing information and instructions to be executed by processor 3304. Main memory 3306 also may be used for storing temporary variables or other intermediate information during execution of instructions to be executed by processor 3304. Computer system 3300 further includes a read only memory (ROM) 3308 or other static storage device coupled to bus 3302 for storing static information and instructions for processor 3304. A storage device 3310, such as a magnetic disk or optical disk, is provided and coupled to bus 3302 for storing information and instructions.

Computer system 3300 may be coupled via bus 3302 to a display 3312, such as a cathode ray tube (CRT), for displaying information to a computer user. An input device 3314, including alphanumeric and other keys, is coupled to bus 3302 for communicating information and command selections to processor 3304. Another type of user input device is cursor control 3316, such as a mouse, a trackball, or cursor direction keys for communicating direction information and command selections to processor 3304 and for controlling cursor movement on display 3312. This input device typically has two degrees of freedom in two axes, a first axis (e.g., x) and a second axis (e.g., y), that allows the device to specify positions in a plane.

The invention is related to the use of computer system 3300 for implementing the techniques described herein. According to one embodiment of the invention, those techniques are performed by computer system 3300 in response to processor 3304 executing one or more sequences of one or more instructions contained in main memory 3306. Such instructions may be read into main memory 3306 from another computer-readable medium, such as storage device 3310. Execution of the sequences of instructions contained in main memory 3306 causes processor 3304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 3304 for execution. Such a medium may take many forms, including but not limited to, non-volatile media, volatile media, and transmission media. Non-volatile media includes, for example, optical or magnetic disks, such as storage device 3310. Volatile media includes dynamic memory, such as main memory 3306. Transmission media includes coaxial cables, copper wire and fiber optics, including the wires that comprise bus 3302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 3304 for execution. For example, the instructions may initially be carried on a magnetic disk of a remote computer. The remote computer can load the instructions into its dynamic memory and send the instructions over a telephone line using a modem. A modem local to computer system 3300 can receive the data on the telephone line and use an infra-red transmitter to convert the data to an infra-red signal. An infra-red detector can receive the data carried in the infra-red signal and appropriate circuitry can place the data on bus 3302. Bus 3302 carries the data to main memory 3306, from which processor 3304 retrieves and executes the instructions. The instructions received by main memory 3306 may optionally be stored on storage device 3310 either before or after execution by processor 3304.

Computer system 3300 also includes a communication interface 3318 coupled to bus 3302. Communication interface 3318 provides a two-way data communication coupling to a network link 3320 that is connected to a local network 3322. For example, communication interface 3318 may be an integrated services digital network (ISDN) card or a modem to provide a data communication connection to a corresponding type of telephone line. As another example, communication interface 3318 may be a local area network (LAN) card to provide a data communication connection to a compatible LAN. Wireless links may also be implemented. In any such implementation, communication interface 3318 sends and receives electrical, electromagnetic or optical signals that carry digital data streams representing various types of information.

Network link 3320 typically provides data communication through one or more networks to other data devices. For example, network link 3320 may provide a connection through local network 3322 to a host computer 3324 or to data equipment operated by an Internet Service Provider (ISP) 3326. ISP 3326 in turn provides data communication services through the world wide packet data communication network now commonly referred to as the "Internet" 3328. Local network 3322 and Internet 3328 both use electrical, electromagnetic or optical signals that carry digital data streams. The signals through the various networks and the signals on network link 3320 and through communication interface 3318, which carry the digital data to and from computer system 3300, are exemplary forms of carrier waves transporting the information.

Computer system 3300 can send messages and receive data, including program code, through the network(s), network link 3320 and communication interface 3318. In the Internet example, a server 3330 might transmit a requested code for an application program through Internet 3328, ISP 3326, local network 3322 and communication interface 3318.

The received code may be executed by processor 3304 as it is received, and/or stored in storage device 3310, or other non-volatile storage for later execution. In this manner, computer system 3300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for managing a Business Operation, comprising:
  collecting measurements from an Infrastructure Layer, wherein said Infrastructure Layer measurements are associated with said business operation;
    wherein said Infrastructure Layer includes one or more infrastructure objects upon which an Application Layer is implemented, said infrastructure objects including network, systems, storage, or middleware elements;
  concurrent with collecting measurements from said Infrastructure Layer, collecting measurements from said Application Layer, wherein Application Layer measurements are associated with said Business Operation;
    wherein said Application Layer includes one or more application objects upon which a Business Layer is implemented, said application objects including application services or application components;
  concurrent with collecting measurements from said Infrastructure Layer and said Application Layer, collecting measurements from said Business Layer, wherein said Business Layer measurements are associated with said Business Operation;
    wherein said Business Layer includes one or more business objects, said business objects including business services, business traffic, or business transactions;
  based on the measurements collected from each of the Infrastructure Layer, the Application Layer, and the Business Layer generating a first set of Events;

wherein each Event in the first set of Events is a data structure indicating an observed state change or phenomenon occurrence at one of the Infrastructure Layer, the Application Layer, and the Business Layer;

based on the first set of Events and a plurality of policies applied to Events in the first set of Events, generating a second set of Events;

wherein the second set of Events includes:
  (a) a third set of Events that occurred at the Business Layer;
  (b) a fourth set of Events that occurred at the Application Layer; and
  (c) a fifth set of Events that occurred at the Infrastructure Layer;

correlating Events from the third set of Events with Events from at least one of the fourth set of Events or the fifth set of Events;

wherein the method is performed by one or more computing devices.

2. The method of claim 1 further comprising modeling said Business Operation as an instance of an enterprise Model of Layers of Business Operation, said Layers of Business Operation including:

said Infrastructure Layer, wherein said Infrastructure Layer includes Software Infrastructure Monitored Objects that enable the operation of the Application Layer Monitored Objects, and Network Infrastructure Monitored Objects that enable the operation of Software Infrastructure Monitored Objects;

said Application Layer, wherein said Application Layer includes Monitored Objects that enable the operation of Business Layer Monitored Objects;

said Business Layer, wherein said Business Layer includes Monitored Objects that enable Business Operations;

Associations that include Containment, Dependency and Hosting relationships between Monitored Objects in the Business layer, Application layer and Infrastructure layer; and wherein said Model associates Business Layer Events and Business Layer Monitored Objects to Application Layer Events and Application Layer Monitored Objects and further to Infrastructure Layer Events and Infrastructure Layer Monitored Objects.

3. The method of claim 2 wherein:

the Monitored Objects in the Business Layer include at least one of Business Services, Business Service Operations, and Business Traffic Groups;

the Monitored Objects in the Application Layer include at least one of Application Services and Application Components;

the Monitored Objects in the Application Layer include at least one of Application Services and Application Components;

the Software Infrastructure Monitored Objects include at least one of Web Servers, Application Servers, and Database Servers; and the Network Infrastructure Monitored Objects include at least one of Hosts and IP interfaces.

4. A computer-readable storage medium storing one or more sequences of instructions which, when executed by one or more processors, causes the one or more processors to perform the method recited in claim 3.

5. A computer-readable storage medium storing one or more sequences of instructions which, when executed by one or more processors, causes the one or more processors to perform the method recited in claim 2.

6. The method of claim 1 further comprising:
performing discovery of application interactions in the Application Layer; and
performing discovery of workflows and business processes in the Business Layer.

7. The method of claim 6 further comprising the step of using said discovery of application interactions in the Application Layer and said discovery of workflows and business processes in the Business Layer to aid in correlating Events across each layer of the Business Operation by enriching a model of layers for the Business Operation through such discovery.

8. A computer-readable storage medium storing one or more sequences of instructions which, when executed by one or more processors, causes the one or more processors to perform the method recited in claim 7.

9. A computer-readable storage medium storing one or more sequences of instructions which, when executed by one or more processors, causes the one or more processors to perform the method recited in claim 6.

10. The method of claim 1 further comprising:
tracing Probable Cause of issues observed at the Business Layer to issues in the Application Layer or Infrastructure Layer by using Events from the third set of Events Anchor Events in the step of correlating Events; and
determining an impact on the Business Operation from said Events from the third set of Events;
assigning the impact to Events in at least one of the fourth set of Events or the fifth set of Events.

11. A computer-readable storage medium storing one or more sequences of instructions which, when executed by one or more processors, causes the one or more processors to perform the method recited in claim 10.

12. The method of claim 1 further comprising:
defining Business Exception Events in terms of complex combinations of cumulative technical and business Indicators including Service Level indicators;
generating real-time notifications of the occurrence of said Business Exception Events; and
determining at least one underlying Probable Causes that caused the Business Exception Event;
wherein the Business Exception Events are in the third set of Events.

13. A computer-readable storage medium storing one or more sequences of instructions which, when executed by one or more processors, causes the one or more processors to perform the method recited in claim 12.

14. The method of claim 1 wherein the steps of collecting measurements and correlating Events from the Infrastructure Layer, the Application Layer, and the Business Layer are performed in real time, concurrent with the Business Operation.

15. A computer-readable storage medium storing one or more sequences of instructions which, when executed by one or more processors, causes the one or more processors to perform the method recited in claim 14.

16. A computer-readable storage medium storing one or more sequences of instructions which, when executed by one or more processors, causes the one or more processors to perform the method recited in claim 1.

17. The method of claim 1 wherein the step of generating Events includes generating Normalized Events by translating measurements into a common Event format, wherein the common Event format comprises a common structure for event attributes described in a data model.

18. A computer-readable storage medium storing one or more sequences of instructions which, when executed by one or more processors, causes the one or more processors to perform the method recited in claim 17.

19. The method of claim 1, further comprising automatically identifying, by the information system, one or more Events in the Application Layer or Infrastructure Layer that are Probable Causes of issues observed at the Business Layer;
wherein the step of automatically identifying is performed without user intervention.

20. A computer-readable storage medium storing one or more sequences of instructions which, when executed by one or more processors, causes the one or more processors to perform the method recited in claim 19.

21. The method of claim 1, wherein collecting measurements from each of the Infrastructure Layer, Application Layer, and Business Layer comprises monitoring structured network traffic at each of the Infrastructure Layer, Application Layer, and Business Layer.

22. A computer-readable storage medium storing one or more sequences of instructions which, when executed by one or more processors, causes the one or more processors to perform the method recited in claim 21.

23. The method of claim 1, wherein:
the step of generating the first set of Events comprises generating a stream of structured network traffic, said structured network traffic comprising the first set of Events, wherein the first set of Events is a set of messages transmitted by one or more applications over the network;
the step of generating the second set of Events comprises: receiving Events in the first set of Events over the network, and generating Normalized Events based on the the received Events.

24. A computer-readable storage medium storing one or more sequences of instructions which, when executed by one or more processors, causes the one or more processors to perform the method recited in claim 23.

25. The method of claim 1, further comprising determining that a first particular Event from the Business Layer correlates to a second particular Event from one of the Infrastructure Layer or Application Layer.

26. A computer-readable storage medium storing one or more sequences of instructions which, when executed by one or more processors, causes the one or more processors to perform the method recited in claim 25.

27. The method of claim 1, wherein the plurality of policies includes policies that are conditioned upon elements of two or more Events in the first set of Events.

28. A computer-readable storage medium storing one or more sequences of instructions which, when executed by one or more processors, causes the one or more processors to perform the method recited in claim 27.

29. The method of claim 1, wherein Events in the first set of Events or the second set of Events include at least one of a Business Event, Application Event, Infrastructure Event, Transaction Event, Threshold Event, Status Change Event, Activity Event, Exception Event, Service Level Objective Violation, Performance Event, Managed Object Event, Admin Event, or Traffic Event.

30. A computer-readable storage medium storing one or more sequences of instructions which, when executed by one or more processors, causes the one or more processors to perform the method recited in claim 29.

31. The method of claim 1, wherein the first set of Events comprises one or more particular Events, each event of said one or more particular Events corresponding to a direct measurement of an attribute of an object;
wherein the object is one of the infrastructure objects, application objects, or business objects;
wherein the event specifies one of (a) the direct measurement; (b) a change in the direct measurement; (c) a state indicated by the direct measurement; or (d) a state change indicated by the direct measurement.

32. A computer-readable storage medium storing one or more sequences of instructions which, when executed by one or more processors, causes the one or more processors to perform the method recited in claim 31.

33. The method of claim 1, wherein the collected measurements include a particular measurement reflecting a particular business transaction, wherein the first set of Events includes one or more Events based on the particular measurement.

34. A computer-readable storage medium storing one or more sequences of instructions which, when executed by one or more processors, causes the one or more processors to perform the method recited in claim 33.

35. The method of claim 1, wherein correlating Events comprises correlating Alerts associated with Events.

36. A computer-readable storage medium storing one or more sequences of instructions which, when executed by one or more processors, causes the one or more processors to perform the method recited in claim 35.

37. The method of claim 1, wherein the second set of Events comprises one or more Alerts.

38. A computer-readable storage medium storing one or more sequences of instructions which, when executed by one or more processors, causes the one or more processors to perform the method recited in claim 37.

* * * * *